(12) United States Patent
Arnold

(10) Patent No.: US 11,354,954 B2
(45) Date of Patent: Jun. 7, 2022

(54) RFID OR BIOMETRIC LOCKING MECHANISM FITTED ON A CONCEALED POCKET OF A CONTAINER OPERATED VIA A MOBILE APPLICATION OR THROUGH AN RFID ARTICLE OR OTHER BIOMETRIC TECHNOLOGIES

(71) Applicant: Delbert Cleveland Arnold, Knoxville, TN (US)

(72) Inventor: Delbert Cleveland Arnold, Knoxville, TN (US)

( * ) Notice: Subject to any disclaimer, the term of this patent is extended or adjusted under 35 U.S.C. 154(b) by 584 days.

(21) Appl. No.: 16/522,534

(22) Filed: Jul. 25, 2019

(65) Prior Publication Data

US 2020/0035047 A1     Jan. 30, 2020

Related U.S. Application Data

(63) Continuation-in-part of application No. 16/522,521, filed on Jul. 25, 2019, now abandoned.

(60) Provisional application No. 62/703,142, filed on Jul. 25, 2018.

(51) Int. Cl.
| | |
|---|---|
| *G07C 9/00* | (2020.01) |
| *G06K 7/10* | (2006.01) |
| *A45C 3/00* | (2006.01) |
| *F41C 33/06* | (2006.01) |
| *F41H 5/08* | (2006.01) |
| *F41H 5/013* | (2006.01) |

(52) U.S. Cl.
CPC ............ *G07C 9/00174* (2013.01); *A45C 3/00* (2013.01); *F41C 33/06* (2013.01); *F41H 5/08* (2013.01); *G06K 7/10366* (2013.01); *F41H 5/013* (2013.01)

(58) Field of Classification Search
CPC ......... G07C 9/0017; A45C 3/00; F41C 33/06; F41H 5/08; F41H 5/013; G06K 7/10366
USPC ........................................................ 206/317
See application file for complete search history.

(56) References Cited

U.S. PATENT DOCUMENTS

| | | | |
|---|---|---|---|
| 5,967,393 | A | 10/1999 | Clarke, III |
| 8,074,477 | B1 | 12/2011 | Weiche |
| 9,530,266 | B2 | 12/2016 | Delattre et al. |
| 9,599,434 | B2 | 3/2017 | Liu |
| 9,803,956 | B2 | 10/2017 | Ellingson |
| 2016/0010948 | A1 | 1/2016 | Gerdes |
| 2018/0073837 | A1* | 3/2018 | Bahu ............... F41C 33/06 |
| 2020/0035047 | A1* | 1/2020 | Arnold ........... G06K 7/10366 |

(Continued)

*Primary Examiner* — Samir Abdosh

(57) ABSTRACT

A concealed carry weapon (CCW) container offers a user a fail-secure locking mechanism to ensure that the CCW stays locked at all times even when there is no power. The CCW container enables the user to quickly and automatically unlock when the user utilizes the biometric recognition system, a pass code, or an RFID (Radio Frequency Identification) tag. The CCW container employs interior and exterior lighting, quick access magnetic closure with or without a locking mechanism attached, and a ballistic armor plate to protect the user's vital body parts using the ballistic armor plat as a shield. Further, a method for managing the fail-secure locking mechanism allows the user to efficiently access the CCW content using a mobile app, the RFID tag, or any other biometric technology. Additionally, the method provides a panic switch that alerts security authorities of an incident and forwarding any salient video or sound thereto.

22 Claims, 23 Drawing Sheets

(56) References Cited

U.S. PATENT DOCUMENTS

2020/0035052 A1\* 1/2020 Arnold ............... G07C 9/00912
2022/0034627 A1\* 2/2022 Donovan ................ F41C 33/06

\* cited by examiner

RFID OR BIOMETRIC LOCKING MECHANISM FITTED ON A CONCEALED POCKET OF A CONTAINER OPERATED VIA A MOBILE APPLICATION OR THROUGH AN RFID ARTICLE OR OTHER BIOMETRIC TECHNOLOGIES

The current application claims a priority to the U.S. Provisional Patent application Ser. No. 62/703,142 filed on Jul. 25, 2018.

FIELD OF THE INVENTION

The present invention relates generally to containers and methods for accessing locking mechanisms. More particularly, the present invention relates to a concealed carry weapon container with a secure closure, a panic switch, a ballistic armor plate and a locking mechanism that is particularly centered around biometrics and RFID (Radio Frequency Identification) authentication. Further, the present invention includes a system and method for managing the locking mechanism thereof.

BACKGROUND OF THE INVENTION

Presently, gun safes and similar reinforced storages are generally stationary or elsewise require a dedicated key that can be misplaced or difficult to handle in certain situations. It is therefore the objective of the present invention to provide a protocol and container in connection and synced with a computing device of a user and at least one RFID article, where the container and computing device possess visual acquisition means to authenticate the user in lieu of or alongside at least one RFID (Radio Frequency Identification) tag. Further the container, possessed of a processor can logically determine by sensor and scanning for nearby entities such as a facial or fingerprint scan and referenced to a registered scan to determine if the specific user is attempting access to the contents of the container sealed behind a fail-secure lock. The contents may typically comprise an article that is licensed or regulated to be in the control of the user or otherwise inaccessible to those lacking the appropriate authorization such as a firearm, similar, or elsewise article extraneous to the apparatus. It will further be appreciated that the system provides a means of identifying when the container is an unacceptable distance from the user if they keep their computing device on their person, ensuring that the restricted article is retained under greater control than a conventional container. Further, through a processor, the protocol can determine whether the container is being tampered with and respond accordingly by alerting the authorized user of tampering. Still further it is appreciable that the container provides a panic switch that is employable within the operable phase to alert security authorities provided at registration to get in contact with, informing of an incident and forwarding any salient video or sound thereto. In one exemplary embodiment, the apparatus may afford a teacher with a concealed carry article to house the firearm within the container near to their person. When a student should begin to tamper with the apparatus, the protocol monitors the status of the system and relays the tampering thereof to the owner of the container. While inversely if a situation should arise, the user of the apparatus could open the container, provide any number of scans to the visual acquisition means on their computing device or the container, or elsewise an RFID article placed in proximity of a scanning element, and access the contents sealed behind the fail-secure lock and the quick access aperture. Thus, the present invention offers a method and system including an apparatus and protocol that can provide for an accountable, mobile security storage, which allows the user immediate access to the system through registered biometrics and provides alerts of unauthorized access or misplacement of the container and restricted articles such as firearms or elsewise extraneous articles such as money, jewelry, and any other valuable articles.

SUMMARY OF THE INVENTION

A concealed carry weapon (CCW) container offers a user with a secure closure, a panic switch, a ballistic armor plate and a locking mechanism to ensure that the CCW pocket inside the container or a CCW bag stays locked at all times even when there is no power. The CCW container enables a user to quickly and automatically unlock when the user utilizes the facial recognition system, a pass code, or the RFID (Radio Frequency Identification) portable Tag. Additionally, the present invention allows the user to operate the locking mechanism by other biometric technologies such as finger, eye recognition, voice recognition, or any other locking mechanism means. The CCW container not only employs exterior lighting, but also interior illumination using LED (light emit diode) lights to ensure that the inside of the CCW container is well lit, so that the user can easily see the content of the CCW container in dark environment or if the user with the container is in an area that is not well lit. Additionally, the CCW container of the present invention provides the user with quick access to the CCW container in case that the user needs to draw their weapon from the CCW container which can be completed very quickly because of the quick access pocket which allows the two pocket flaps held together by magnets to be pushed open instantly. Thus, the CCW container with the magnetic closure can work efficiently and effectively even if there is no locking mechanism. Additionally, the CCW container with the magnetic closure may enable the user to overcome the adrenaline effect which is when the blood rushes to the user's core leaving the extremities and making it hard for the user to open the CCW container, for example, to grab zipper pulls to try to retrieve an article or firearm weapon under emergency. But with the magnetic closure, the CCW container of the present invention allows faster drawing of an article or firearm weapon even if the user's adrenaline is pumping. Further, the CCW container can be used as a shield with a ballistic armor plate installed therein in case of an active shooter situation by holding the container over the user's vital body parts and then escaping to safety. The ballistic armor plate that is attached to the container or to a ballistic armor plate pocket mounted to the container can protect the user from the shooter's bullets. Further, the pocket with a ballistic armor plate can be used in a variety of applications including, but not limited to, garments such as suits, coats, jackets, pants, and/or shirts, etc., to protect the user as desired.

A method and system of the present invention allows the user to manage a fail-secure locking mechanism using a mobile app on a personal computing (PC) device, or at least one RFID tag, or any other biometric technology. The fail-secure locking mechanism may be fitted on the CCW, or any other suitable objects. The CCW container and PC device provide visual acquisition means to authenticate the user in lieu of or alongside at least one RFID tag. Additionally, the method and system can determine if a specific user is attempting access to the contents of the container sealed behind a fail-secure lock by scanning for nearby entities such as a facial or fingerprint scan and comparing with a pre-registered scan. The method provides a means of identifying when the container is at an unacceptable distance from the user if the user keeps the corresponding PC device on their person, ensuring that the restricted article is retained under greater control than a conventional container. Further, the method can determine whether the fail-secure lock is being tampered with and respond accordingly by alerting the authorized user of tampering. Additionally, the method provides a panic switch that alerts security authorities provided at registration to get in contact with, informing of an incident and forwarding any salient video or sound thereto. In an emergency situation, the method enables the user to quickly open the fail-secure lock by providing any number of scans to the visual acquisition means on their PC device or an RFID tag placed in proximity of a RFID reader, and access the contents sealed behind the fail-secure lock. Thus, the present invention offers a method and system including a fail-secure lock apparatus that can provide for an accountable, mobile security storage, which allows the user immediate access to the system through registered biometrics and provides alerts of unauthorized access or misplacement of the container and restricted articles such as firearms or elsewise extraneous articles such as money, jewelry, and any other valuable articles.

DETAIL DESCRIPTIONS OF THE INVENTION

Figure 1:
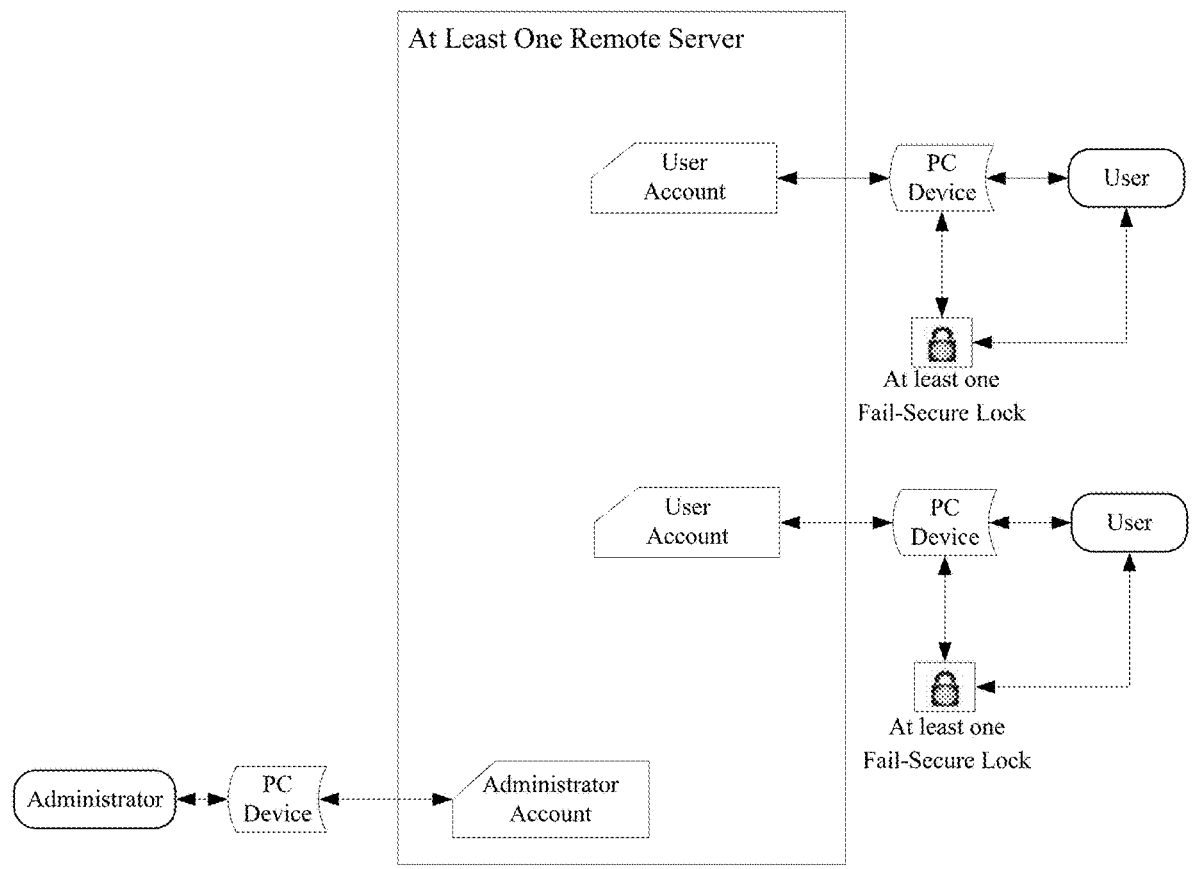
FIG. 1 is a system diagram of the method and system of the present invention.

All illustrations of the drawings are for the purpose of describing selected versions of the present invention and are not intended to limit the scope of the present invention.

As can be seen in FIG. 1 to FIG. 14, the present invention provides a method and system to a user to manage a fail-secure locking mechanism using a mobile app on a personal computing (PC) device, or at least one RFID tag, or any other biometric technology. The fail-secure locking mechanism may be fitted on a concealed pocket of a container, which may include, but is not limited to, a bag, a concealed carry weapon (CCW) bag, a handbag, a backpack, a sling bag, a laptop bag, a bank bag, a messenger bag, a jewelry bag, a suitcase, a box, a security box, a locker, a safe, a door, etc. The container and PC device possess visual acquisition means to authenticate the user in lieu of or alongside at least one RFID tag. Additionally, the method and system of the present invention can determine if the specific user is attempting access to the contents of the container sealed behind a fail-secure lock by scanning for nearby entities such as a facial or fingerprint scan and comparing with a registered scan. The contents may typically comprise an article that is licensed or regulated to be in the control of the user or otherwise inaccessible to those lacking the appropriate authorization. The method and system provides a means of identifying when the container is at an unacceptable distance from the user if the user keeps the corresponding PC device on their person, ensuring that the restricted article is retained under greater control than a conventional container. Further, the present invention can determine whether the fail-secure lock is being tampered with and respond accordingly by alerting the authorized user of tampering. Additionally, the present invention provides a panic switch that is employable to alert security authorities provided at registration to get in contact with, informing of an incident and forwarding any salient video or sound thereto. In one exemplary embodiment, the apparatus may afford a teacher with a concealed carry article to house the firearm within the container near to their person. When a student should begin to tamper with the fail-secure lock on the apparatus, the method monitors the status of the system and relays the tampering thereof to the owner of the container. While inversely if a situation should arise, the user of the apparatus could open the container by providing any number of scans to the visual acquisition means on their PC device or the container, or elsewise an RFID tag placed in proximity of a scanning element, and access the contents sealed behind the fail-secure lock and the quick access aperture. Thus, the present invention offers a method and system including a fail-secure lock apparatus that can provide for an accountable, mobile security storage, which allows the user immediate access to the system through registered biometrics and provides alerts of unauthorized access or misplacement of the container and restricted articles such as firearms or elsewise extraneous articles such as money, jewelry, and any other valuable articles.

Figure 2:
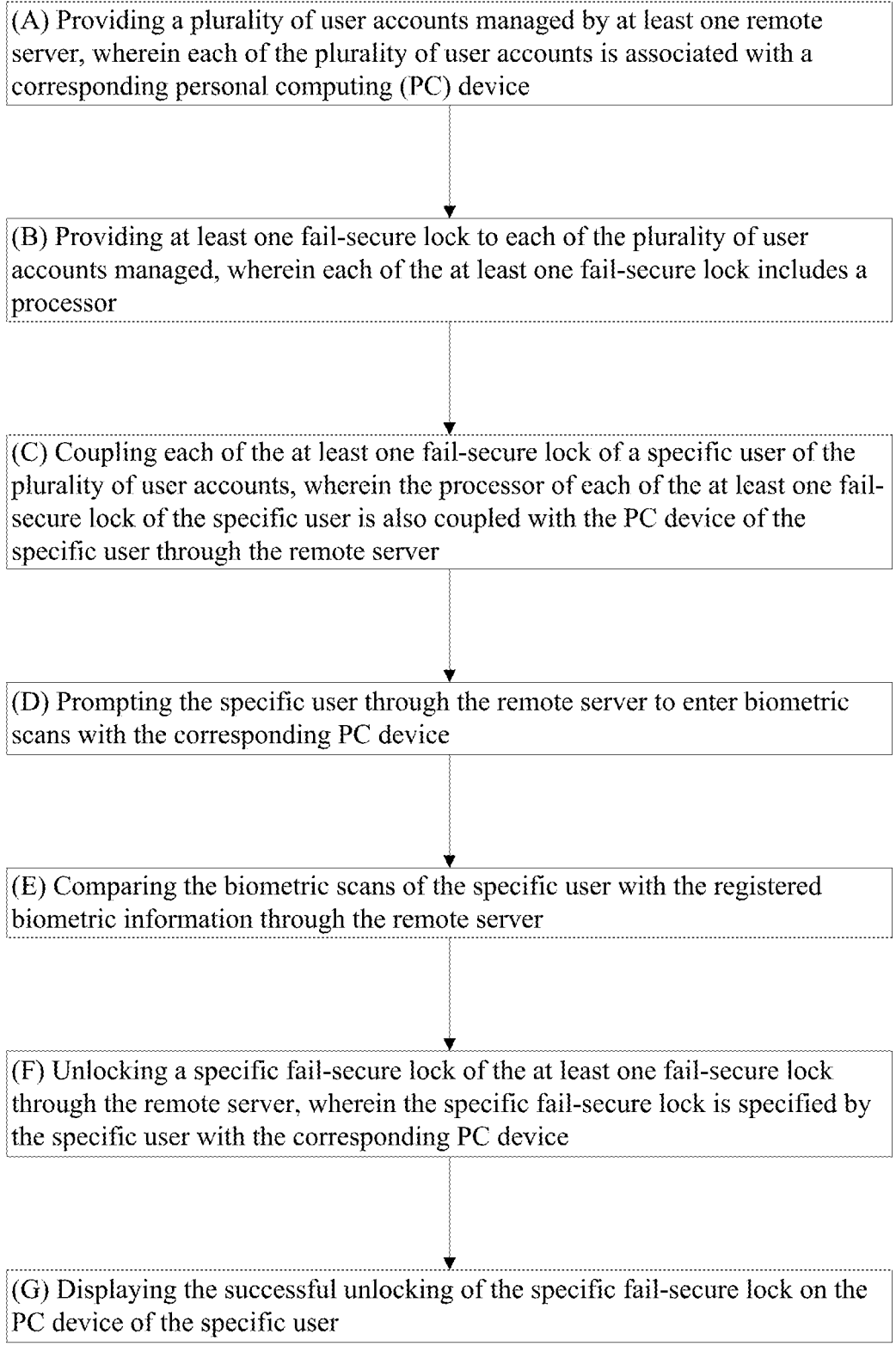
FIG. 2 is an overall process flowchart of the method and system of the present invention.

As can be seen in FIG. 1 and FIG. 2, to manage the fail-secure locking mechanism, the method and system of the present invention provides a plurality of user accounts managed by at least one remote server, wherein each of the plurality of user accounts is associated with a corresponding personal computing (PC) device (Step A). The corresponding user PC device allows the user to interact with the present invention and can include, but is not limited to, a smartphone, a smart watch, a laptop, a desktop, or a tablet PC. The users of the user accounts may include relevant parties such as, but are not limited to, individuals, consumers, corporations, bank staff, banks, security personnel, business owners, managers, safety authorities, administrators, etc. Further, the at least one remote server is used to manage the at least one fail-security lock for each of the plurality of users. The remote server can be managed through an administrator account by an administrator as seen in FIG. 1. Moreover, the remote server is used to execute a number of internal software processes and store data for the present invention. The software processes may include, but are not limited to, server software programs, web-based software applications or browsers embodied as, for example, but not be limited to, websites, web applications, desktop applications, and mobile applications compatible with a corresponding user PC device. Additionally, the software processes may store data into internal databases and communicate with external databases, which may include but are not limited to map databases (such as Google Maps®), databases maintaining data about fail-secure locks, databases maintaining data about security and safety authorities, etc. The interaction with external databases over a communication network may include, but is not limited to, the Internet.

The method and system also provides at least one fail-secure lock to each of the plurality of user accounts managed, wherein each of the at least one fail-secure lock includes a processor (Step B). More specifically, the fail-secure lock may include, but is not limited to, an electromagnetic lock that stays locked when the electrical power is removed. The system of the present invention may include other types of lock, such as, but is not limited to, electric lock, maglock, magnetic lock, etc. Each of the at least one fail-secure lock for a specific user includes a processor, which includes, but is not limited to, a microprocessor, a computing processor, a central computing processor (CPU), a controller, etc. Additionally, the present invention may include, but is not limited to an RFID lock, a security lock with an access pin code, etc. These types of fail-secure lock offered by the system and method of the present invention provide advantageous flexibility to the specific user for the control of the fail-secure lock.

As can be seen in FIG. 2, the overall process followed by the method of the present invention allows a user to manage at least one fail-secure lock. The overall process begins by coupling each of the at least one fail-secure lock of a specific user of the plurality of user accounts, wherein the processor of each of the at least one fail-secure lock of the specific user is coupled with the PC device of the specific user through the remote server (Step C). Subsequently, the method prompts the specific user through the remote server to enter biometric scans with the corresponding PC device, which is managed by the remote server through any suitable wireless communication technology. Thus, the specific user is enabled to manage the fail-secure lock through all the functions and features that the method of the present invention offers using the corresponding PC device (Step D), so that the method is readily able to recognize and authenticate the specific user. The biometric scans used in the system and method of the present system may include, but are not limited to, facial images, facial videos, fingerprints, iris images, iris videos, and any other suitable digital biometric recognition technologies. In the preferred embodiment of the present invention, the corresponding PC device of the specific user is used to obtain the biometric scans. The features, functions, and apparatuses of the corresponding PC device used for obtaining biometric scans may include, but are not limited to, camera, fingerprint scanner, any suitable biometric scanning apparatus, and artificial intelligence technologies. Once necessary biometric scans are obtained, the method compares the biometric scans of the specific user with the registered biometric information through the remote server (Step E), which allows the remote server to verify and authenticate the specific user. Subsequently, the method unlocks a specific fail-secure lock of the at least one fail-secure lock through the remote server, wherein the specific fail-secure lock is specified by the specific user with the corresponding PC device (Step F). Consequently, the method displays the successful unlocking of the specific fail-secure lock on the PC device of the specific user (Step G) as the desired, specific fail-secure lock is unlocked for the specific user.

Figure 3:
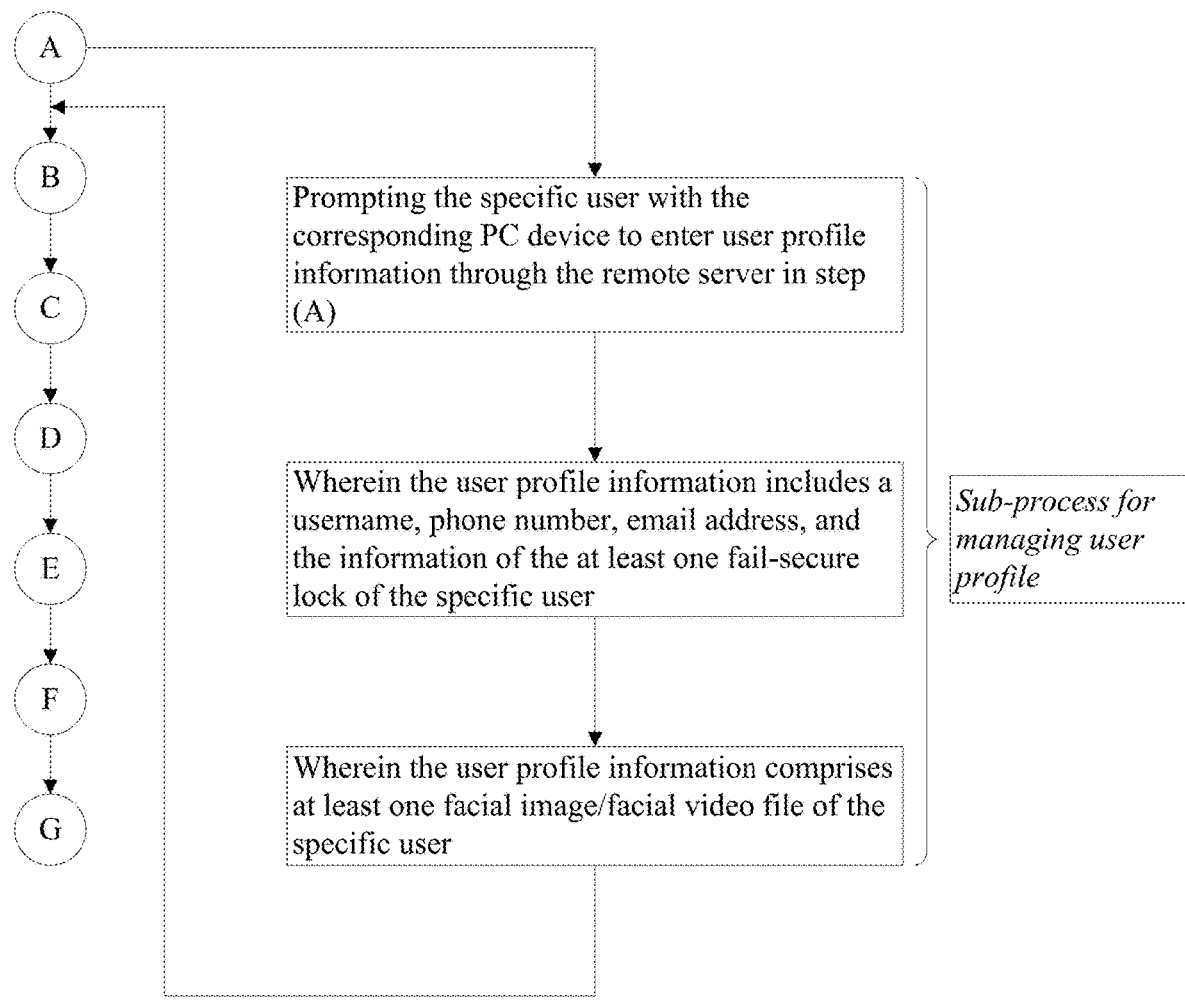
FIG. 3 is a flowchart of a sub-process for managing user profile of the method and system of the present invention.
Figure 4:
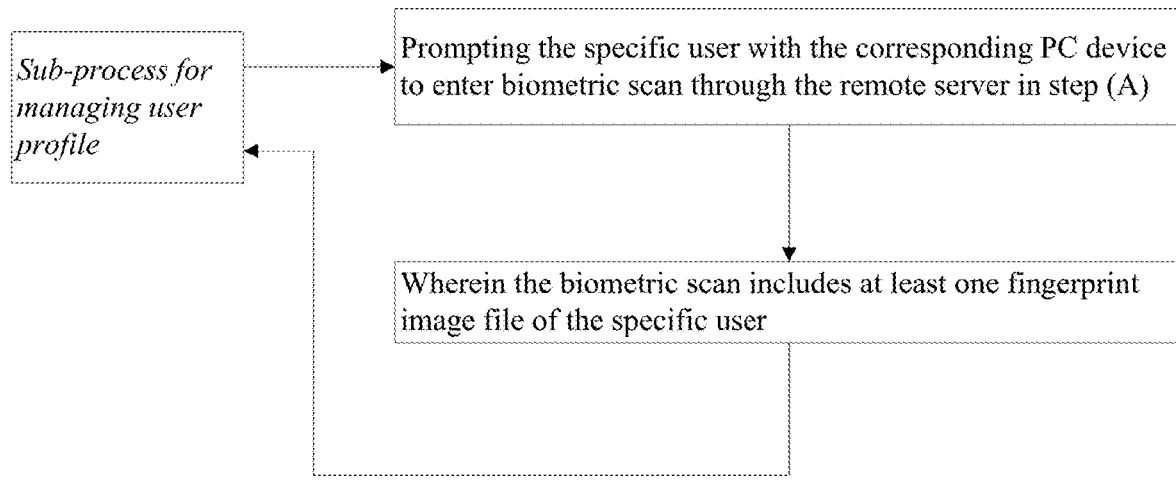
FIG. 4 is a flowchart of an alternative embodiment of the sub-process for managing user profile of the method and system of the present invention.
Figure 5:
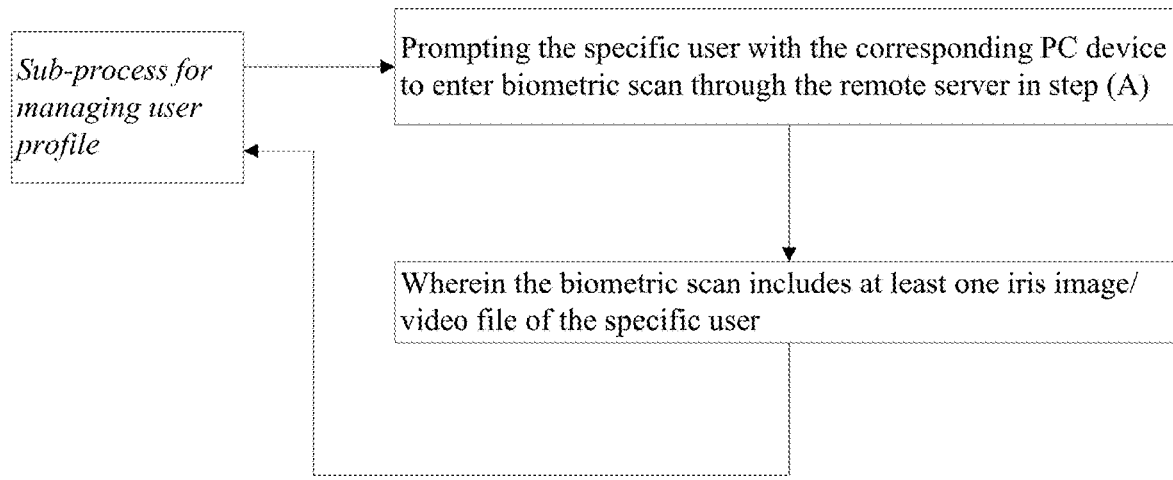
FIG. 5 is a flowchart of an alternative embodiment of the sub-process for managing user profile of the method and system of the present invention.
Figure 6:
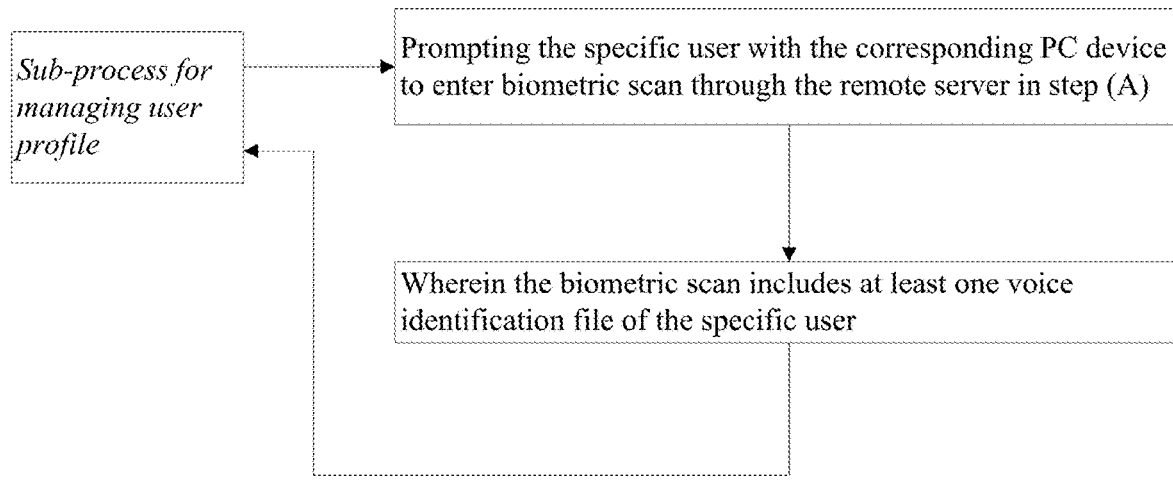
FIG. 6 is a flowchart of an alternative embodiment of the sub-process for managing user profile of the method and system of the present invention.
Figure 7:
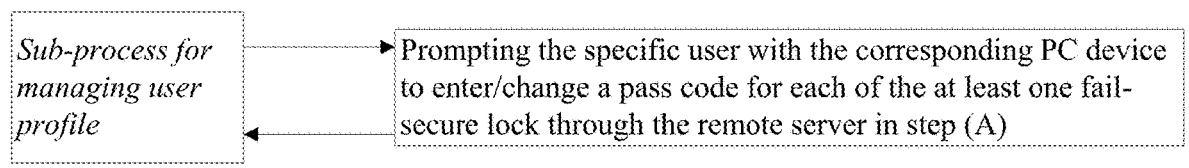
FIG. 7 is a flowchart of an alternative embodiment of the sub-process for managing user profile of the method and system of the present invention.

As can be seen in FIG. 3, the method of the present invention provides a sub-process for managing user profile to set up/change fail-secure lock pass code and enter secure biometric recognition scan files. More specifically, the method prompts the specific user with the corresponding PC device to enter user profile information through the remote server in Step A, wherein the user profile information includes a username, phone number, email address, and the information of the at least one fail-secure lock of the specific user, and wherein the user profile information comprises at least one facial image/facial video file of the specific user. In an alternative embodiment of the present invention, as seen in FIG. 4, the method prompts the specific user with the corresponding PC device to enter biometric scan through the remote server in Step A, wherein the biometric information includes at least one fingerprint image file of the specific user. In another embodiment of the present invention, as seen in FIG. 5, the method prompts the specific user with the corresponding PC device to enter biometric scan through the remote server in Step A, wherein the biometric information includes at least one iris image/video file of the specific user. In yet another alternative embodiment of the present invention, as seen in FIG. 6, the method prompts the specific user with the corresponding PC device to enter biometric scan through the remote server in Step A, wherein the biometric information includes at least one iris image/video file of the specific user. In another embodiment of the present invention, as seen in FIG. 7, the method prompts the specific user with the corresponding PC device to enter/change a pass code for each of the at least one fail-secure lock through the remote server.

Figure 8:
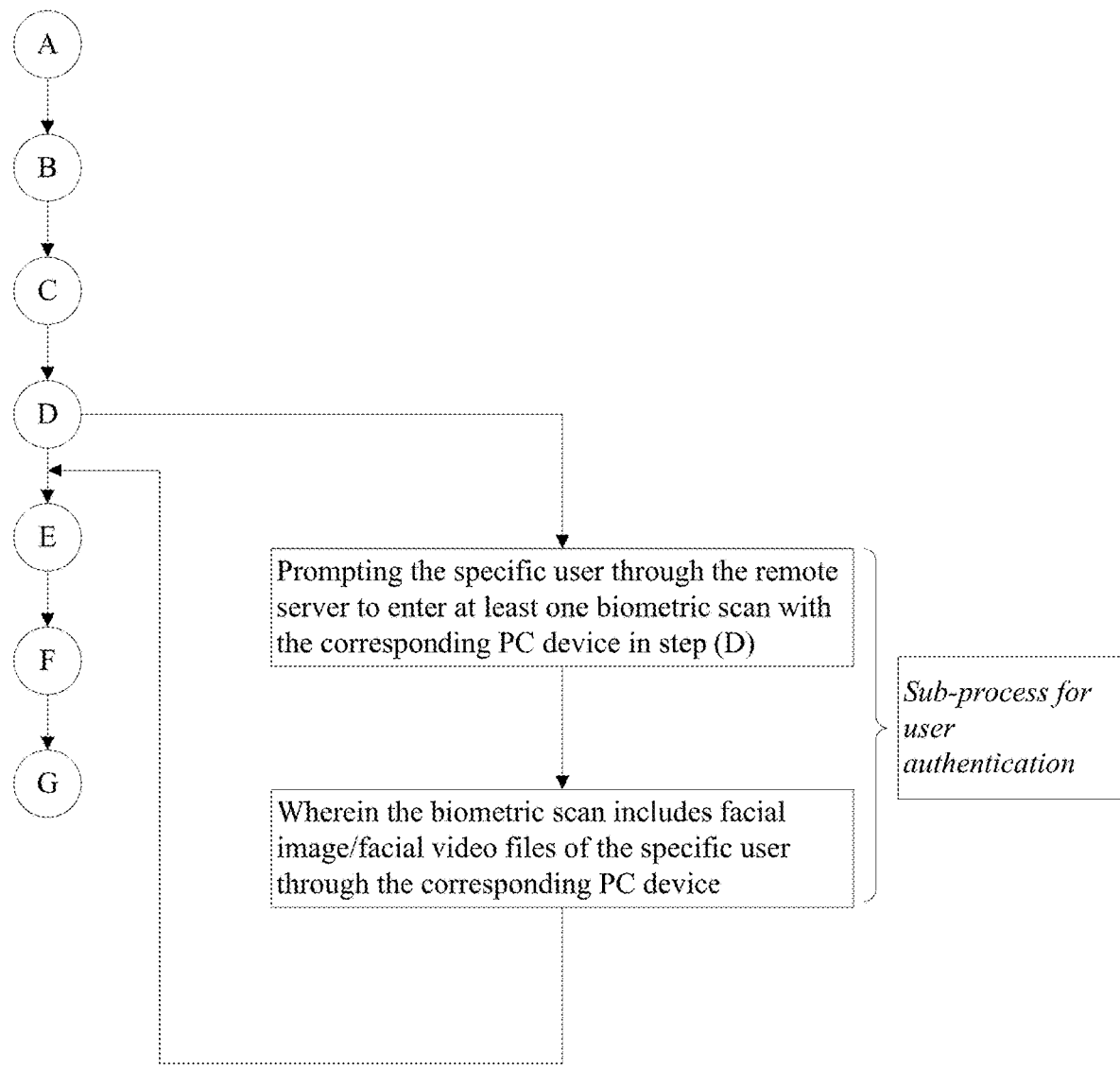
FIG. 8 is a flowchart of a sub-process for managing user authentication of the method and system of the present invention.
Figure 9:
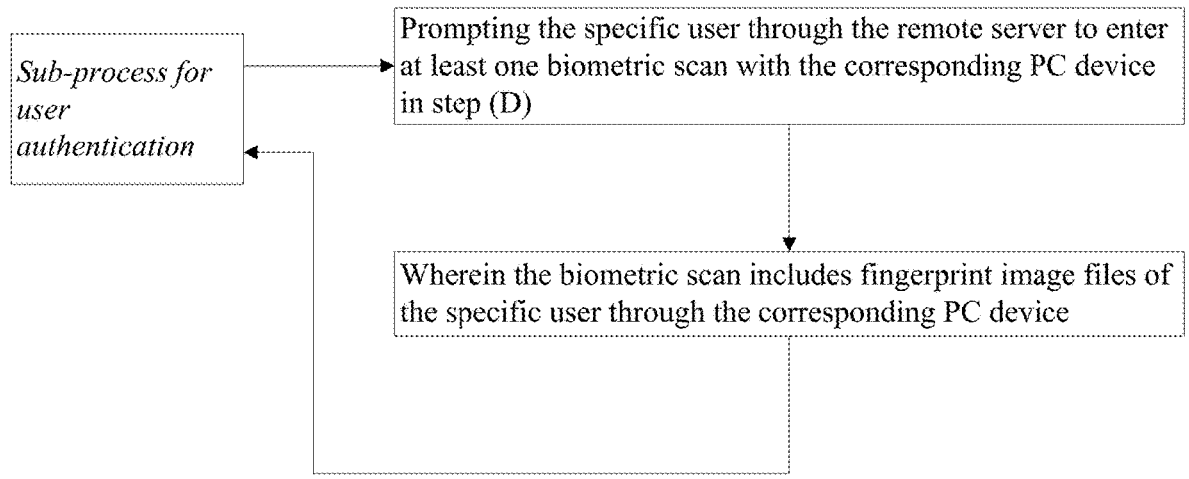
FIG. 9 is a flowchart of an alternative embodiment of the sub-process for managing user authentication of the method and system of the present invention.
Figure 10:
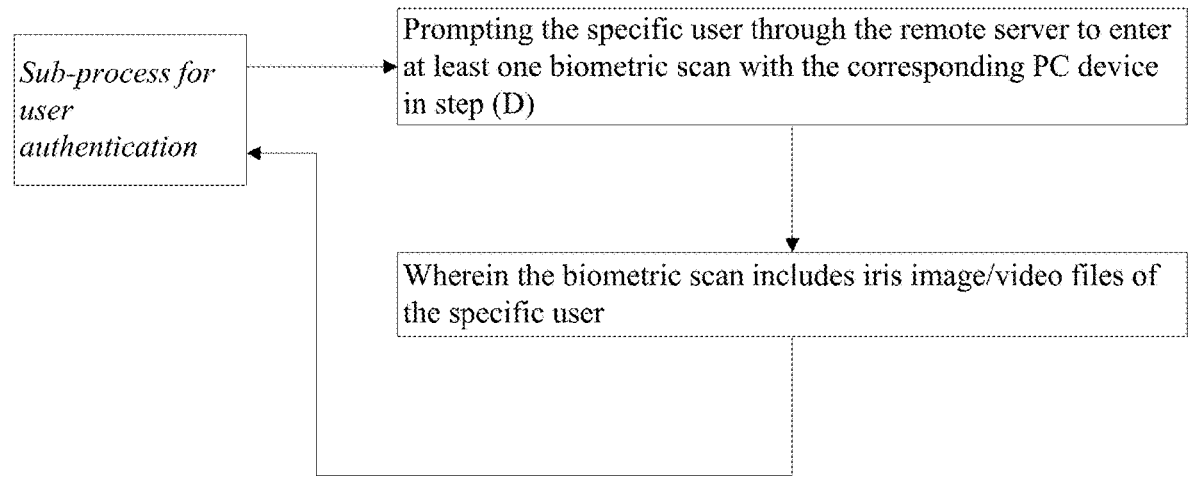
FIG. 10 is a flowchart of an alternative embodiment of the sub-process for managing user authentication of the method and system of the present invention.
Figure 11:
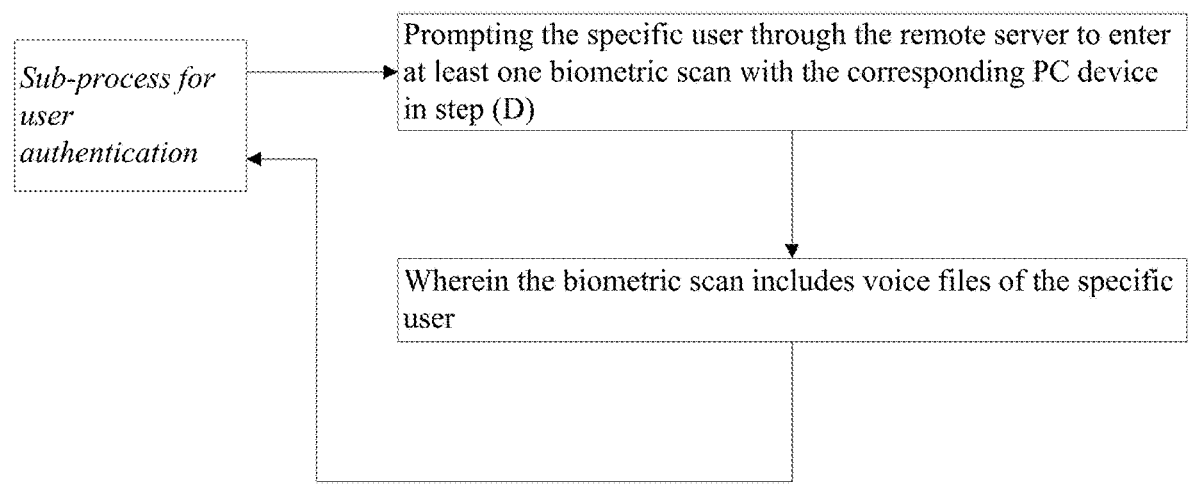
FIG. 11 is a flowchart of an alternative embodiment of the sub-process for managing user authentication of the method and system of the present invention.
Figure 12:
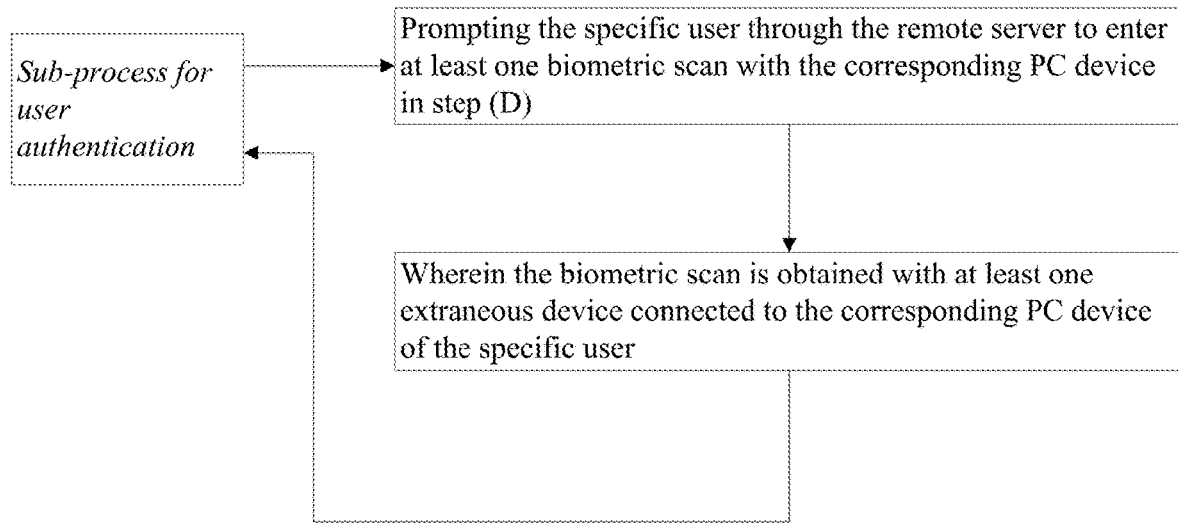
FIG. 12 is a flowchart of an alternative embodiment of the sub-process for managing user authentication of the method and system of the present invention.
Figure 13:
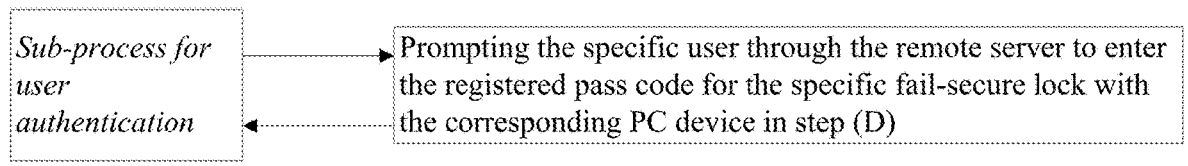
FIG. 13 is a flowchart of an alternative embodiment of the sub-process for managing user authentication of the method and system of the present invention.

As can be seen in FIG. 8, the method of the present invention provides a sub-process for managing user authentication to access the fail-secure lock with a pass code and secure biometric recognition scan files. More specifically, the method prompts the specific user through the remote server to enter at least one biometric scan with the corresponding PC device in Step D, wherein the biometric scan includes facial image/facial video files of the specific user through the corresponding PC device. The facial scan of the specific user may be obtained and entered more than one time in order for the system and method to make accurate matching for the authentication in Step E. In an alternative embodiment of the present invention, as seen in FIG. 9, the method prompts the specific user through the remote server to enter at least one biometric scan with the corresponding PC device in Step D, wherein the biometric scan includes fingerprint image files of the specific user through the corresponding PC device. In another embodiment of the present invention, as seen in FIG. 10, the method prompts the specific user through the remote server to enter at least one biometric scan with the corresponding PC device in Step D, wherein the biometric scan includes iris image/video files of the specific user. In yet another embodiment of the present invention, as seen in FIG. 11, the method prompts the specific user through the remote server to enter at least one biometric scan with the corresponding PC device in Step D, wherein the biometric scan includes voice files of the specific user. Further, the present invention may include other suitable biometric recognition technologies including artificial intelligence applications for the authentication sub-process to access each of the at least one fail-secure lock. Additionally, in another embodiment of the present invention, as seen in FIG. 12, the method prompts the specific user through the remote server to enter at least one biometric scan with the corresponding PC device in Step D, wherein the biometric scan is obtained with at least one extraneous device connected to the corresponding PC device of the specific user. The present invention may include, but is not limited to, camera, digital video recorder, touchscreen device, fingerprint reader, iris reader, facial recognition scanner, voice to text device, microphone, or any other suitable biometric recognition device. In yet another embodiment of the present invention, as seen in FIG. 13, the method prompts the specific user through the remote server to enter the registered pass code for the specific fail-secure lock with the corresponding PC device in Step D, wherein the pass code is the predetermined pass code of the specific user for the specific fail-secure lock.

Figure 14:
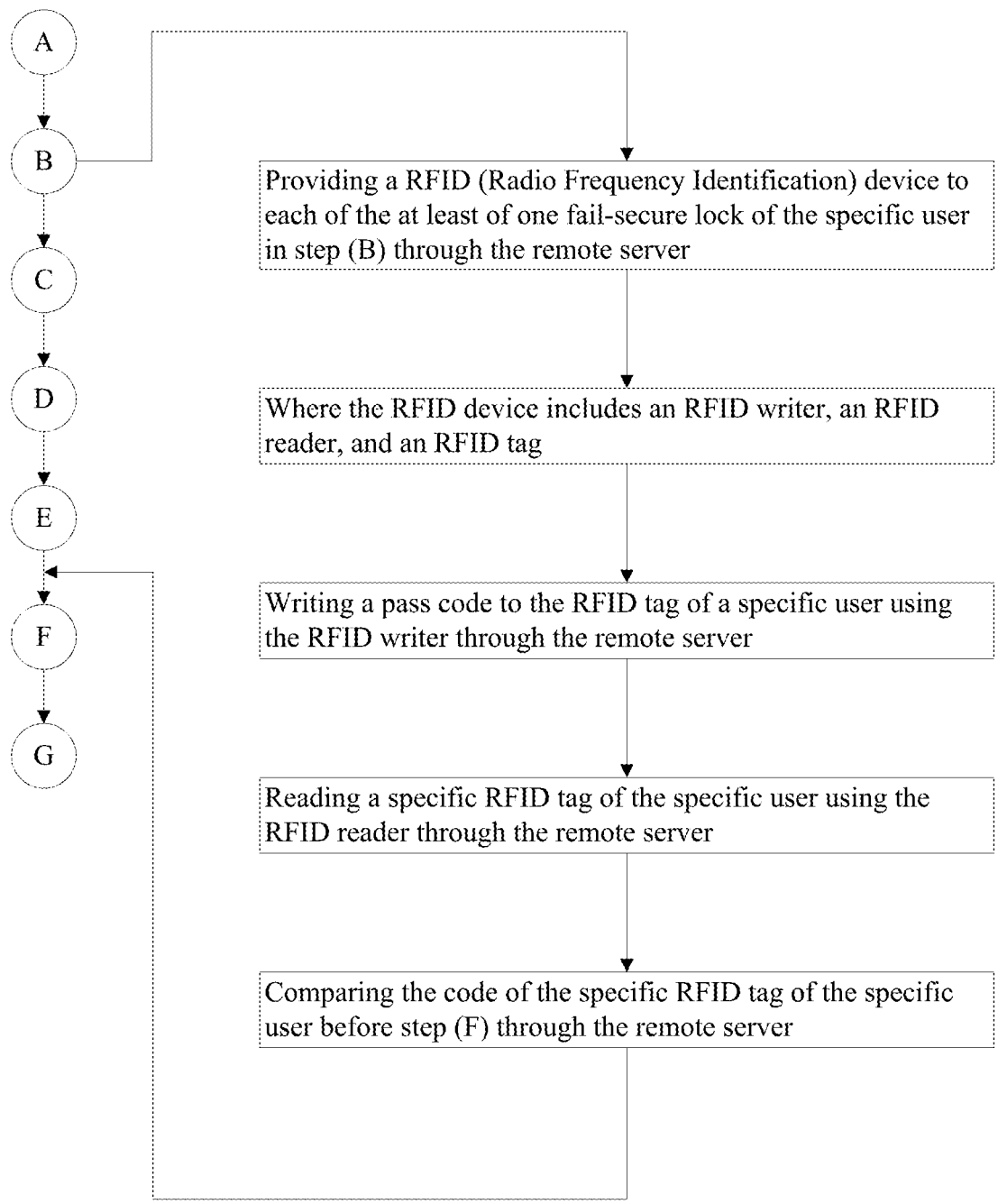
FIG. 14 is a flowchart of a sub-process for accessing the fail-secure lock with an RFID system of the method and system of the present invention.

As can be seen in FIG. 14, the method of the present invention provides a sub-process to the specific user to access the fail-secure lock with an RFID system. More specifically, the method provides a RFID (Radio Frequency Identification) device to each of the at least of one fail-secure lock of the specific user in Step B through the remote server, where the RFID device includes an RFID writer, an RFID reader, and an RFID tag. The method first writes a pass code to the RFID tag of a specific user using the RFID writer through the remote server. Subsequently, the method reads a specific RFID tag of the specific user using the RFID reader through the remote server and compares the code of the specific RFID tag of the specific user before Step F through the remote server. The RFID tag can be a portable tag that comprises any suitable and user desired article including, but not limited to, bracelets, cards, necklaces, pendants, etc.

As can be seen in FIG. 15 to FIG. 23, the apparatus of the present invention comprises a concealed carry weapon container (CCW) with a secure closure, a panic switch and a ballistic armor plate. The container ensures that the CCW pocket inside thereof or a CCW bag stays locked keeping the weapon secure and unlocks quickly and automatically when the user utilizes the facial recognition system, a pass code, or the RFID portable Tag. Additionally, the locking mechanism can be operated by using other biometric technologies such as finger, eye recognition, voice recognition, or any other locking mechanism means. The second purpose of the present invention is to make sure the bag is well lit, so that the user or owner can easily see inside the bag in dark environment or if the user with the container is in an area that is not well lit. The third purpose of the present invention is to allow the user and/or owner quickly access the container and/or the CCW bag in case the user and/or owner needs to draw their weapon from the CCW pocket which can be completed very quickly because of the quick access pocket which allows the two pocket flaps held together by magnets to be pushed open very quickly. Further, the container and/or the CCW bag can be used as a shield with a ballistic armor plate installed therein in case of an active shooter situation by holding the container and/or the CCW bag over the user's vital body parts and then escaping to safety. The ballistic armor plate that is attached to the container or to a ballistic armor plate pocket mounted to the container can protect the user from the shooter's bullets.

Figure 21:
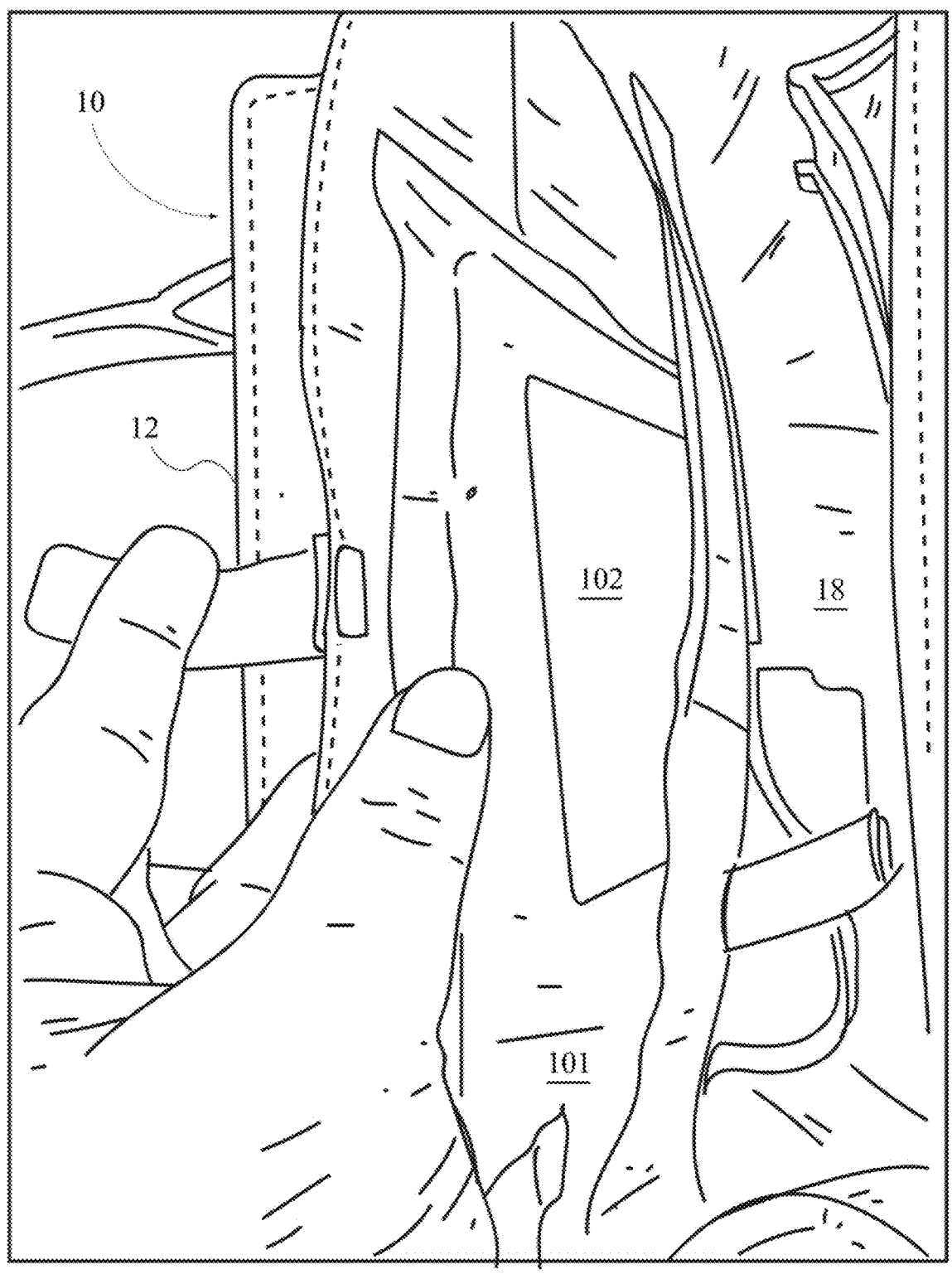
FIG. 21 is a top perspective view of the apparatus of the present invention illustrating a ballistic armor plate and a ballistic pocket.
Figure 23:
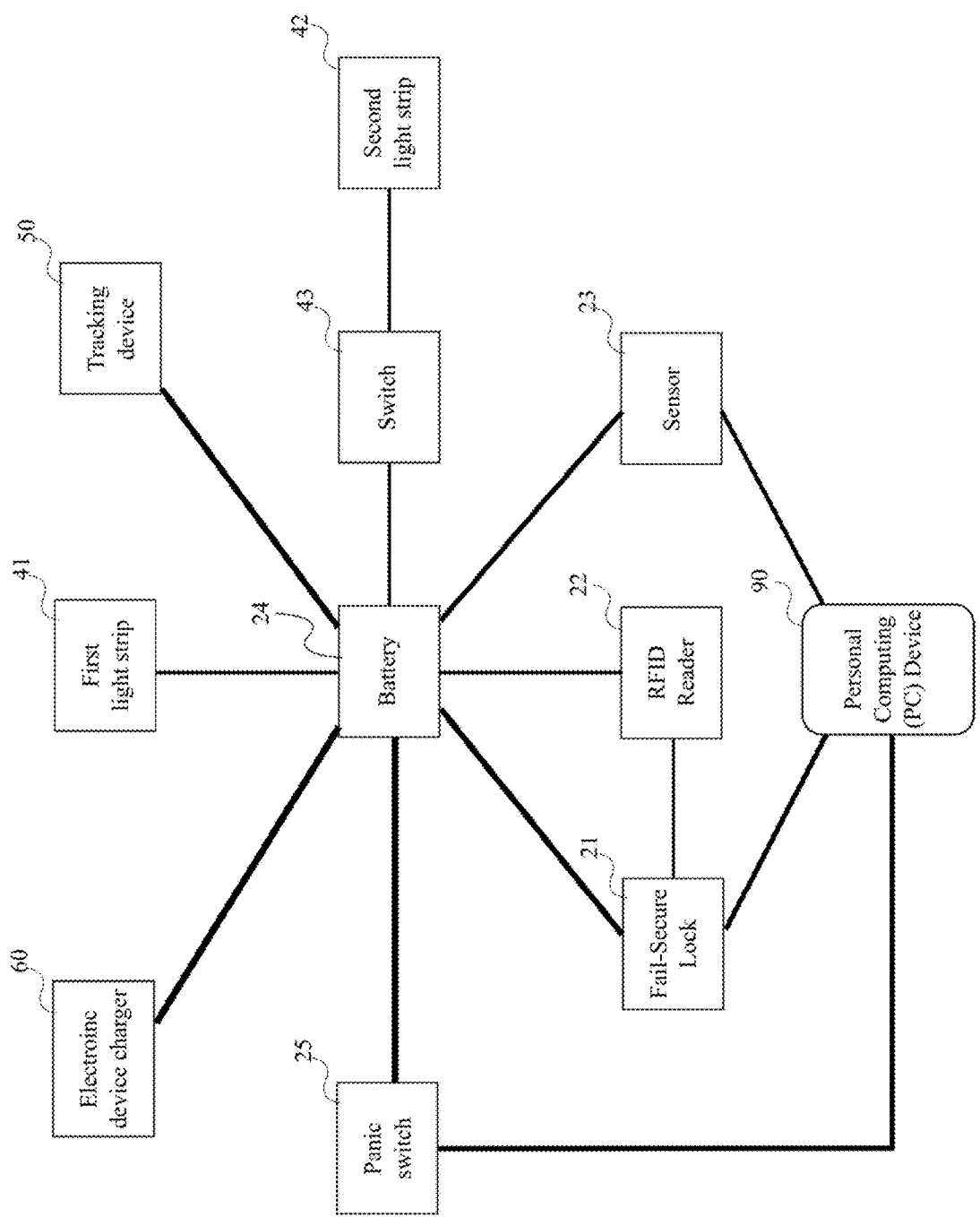
FIG. 23 is an electrical diagram of the apparatus of the present invention.

As can be seen in FIG. 15 to FIG. 17, FIG. 19, and FIG. 21, the CCW container of the present invention comprises a container 10, a locking mechanism 20, a panic switch 25, a ballistic armor plate 102, a magnetic closure 30, a lighting device 40, a tracking device 50, an electronic device charger 60 and a personal computing (PC) device 90. The PC device 90 can include, but is not limited to, a smartphone, a smart watch, a laptop, a desktop, or a tablet PC. The container 10 comprises a front 11, a back 12, top 13, a bottom 14, a first side 15, a second side 16, a strap 17, a first cavity 18, a first aperture 181, a second cavity 19, and a second aperture 191. The strap 17 is terminally connected to the container 10 at the top 13. The first aperture 181 is terminally positioned on the first cavity 18 adjacent the top 13. The first aperture 181 may be open at all times or elsewise provided a closure similar to the quick access aperture and magnetic closure means thereof. The first aperture 181 may further employ a zipper, button, snap, or similar closure means to secure the first aperture shut to a less expediently responsive extent. In the preferred embodiment of the present invention, the locking mechanism 20 is mounted on the container 10 adjacent the first aperture 181. The locking mechanism 20 comprises a fail-secure lock 21 and a battery 24. The battery 24 is positioned inside the first cavity 18 of the container 10 and mounted to the first cavity 18 opposite the bottom 14 across the container 10. Additionally, the battery 24 may include, but is not limited to, a rechargeable battery, a replaceable, or any other suitable power source. The fail-secure lock 21 is exteriorly positioned on the container 10 adjacent the top 13 and is electrically connected to the battery 24, as seen in FIG. 23. The panic switch 25 is positioned on the exterior surface of the container 10 and is electrically connected to the battery 24 of the locking mechanism 20. In the preferred embodiment of the present invention, the panic switch 25 is exteriorly mounted to the strap 17 of the container 10 and can be activated and deactivated by pressing. When activated, the panic switch 25 can emit an alarm, send an alert signal/message, and/or forwarding any salient video or sound thereto the security authorities, and to the PC device 90, as seen in FIG. 23. Additionally, the panic switch 25 can include, but is not limited to, a button type of alarm and/or switch, or any other suitable type of alarming device. The ballistic armor plate 102 is interstitially mounted between the interior and exterior surfaces of the container 10. The ballistic armor plate 102 may include, but is not limited to, a bullet proof metal plate, or any other suitable device. Additionally, the ballistic armor plate 102 can be of any desired thickness and dimensions the user chooses. In an alternative embodiment of the present invention, the container 10 comprises a ballistic pocket 101 which is interiorly mounted to the first cavity and optionally positioned on the back 12. The ballistic armor plate 102 is detachably and interiorly attached to the ballistic pocket 101, as seen in FIG. 21. Further, the ballistic pocket 101 with the ballistic armor plate 102 can be used in a variety of applications including, but not limited to, garments such as suits, coats, jackets, pants, and/or shirts, etc., to protect the user as desired.

Figure 19:
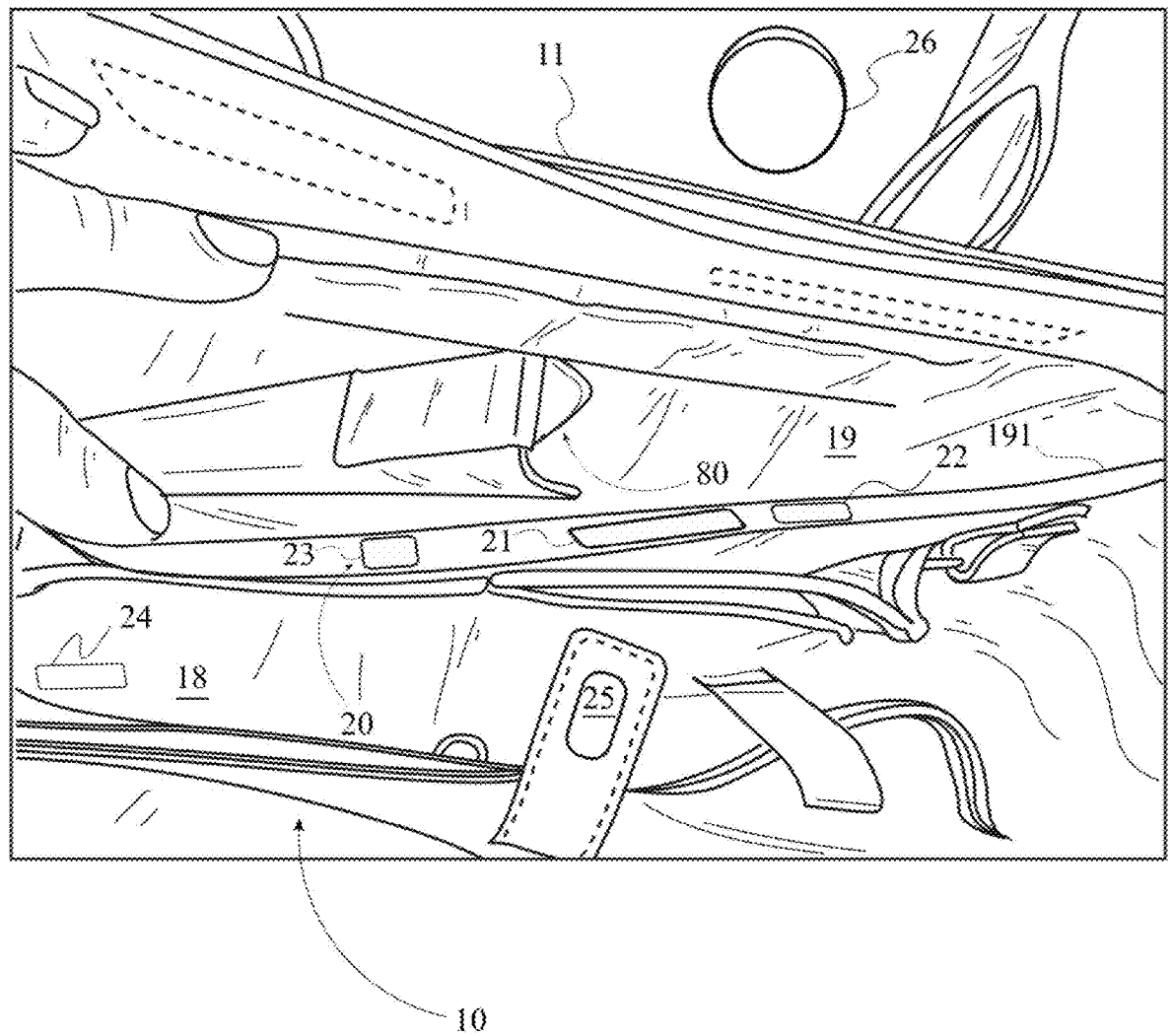
FIG. 19 is a top perspective view of the apparatus of the present invention illustrating a concealed carry weapon pocket and a locking mechanism.

As can be seen in FIG. 19, the second cavity 19 of the container 10 is interiorly mounted to the container 10 opposite the ballistic armor plate 102 across the first cavity 18 of the container 10. The second aperture 191 is terminally positioned on the second cavity 19 adjacent the first aperture 18 of the container 10. In an alternative embodiment of the present invention, the locking mechanism 20 is exteriorly mounted to the second cavity 19 adjacent the second aperture 191.

Figure 16:
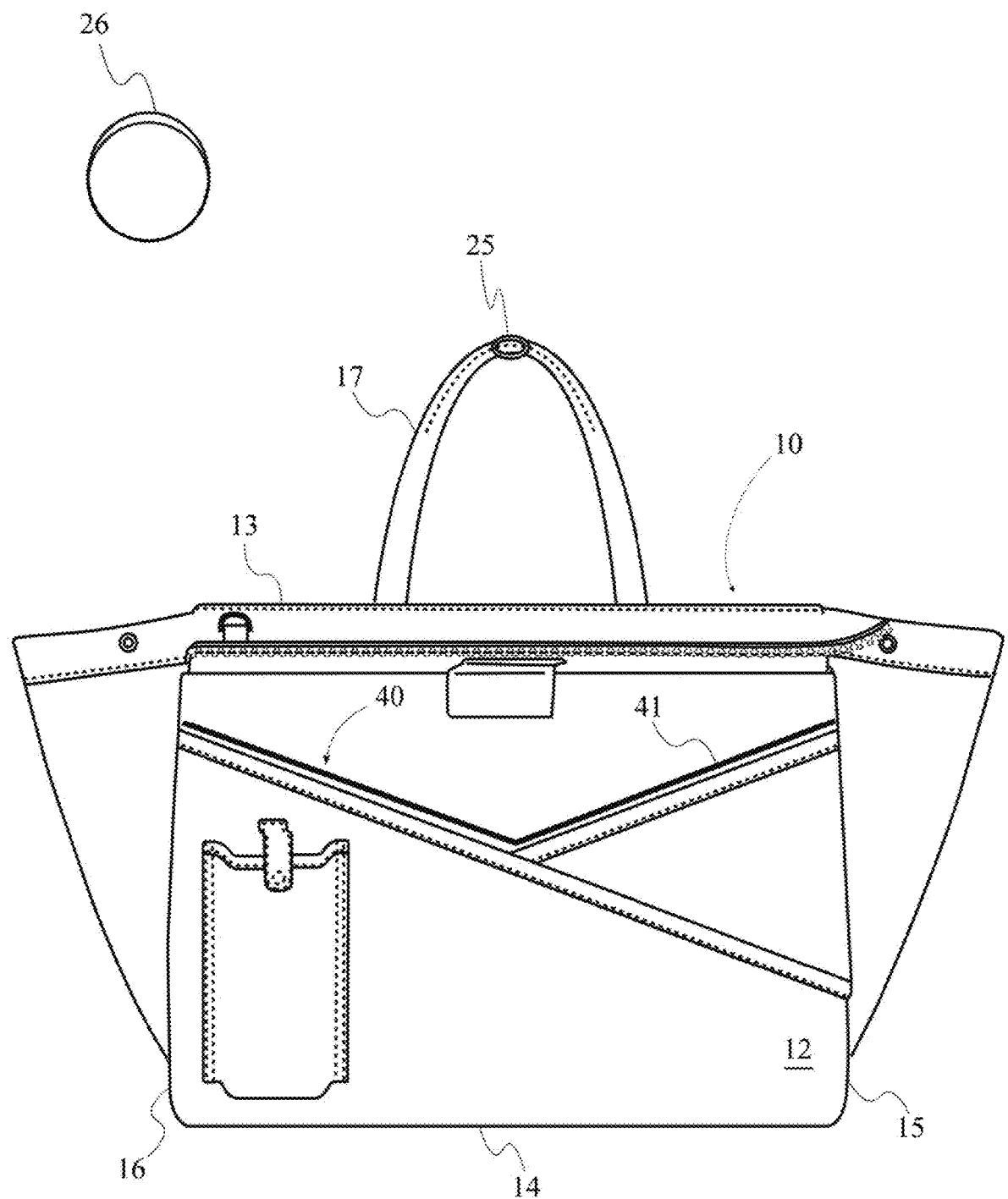
FIG. 16 is a back view of the present invention.
Figure 17:
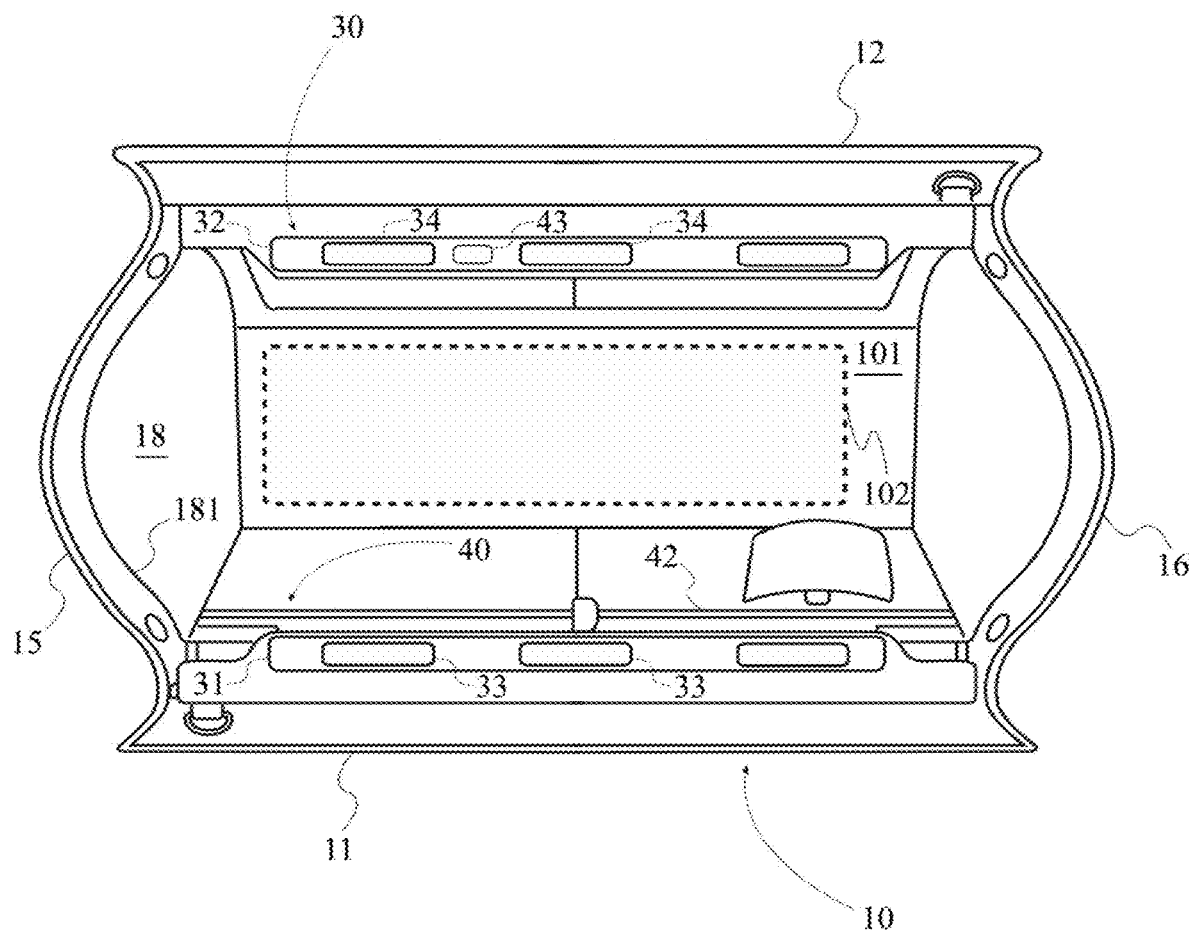
FIG. 17 is a top view of the apparatus of the present invention.

As can be seen in FIG. 16 to FIG. 17, and FIG. 23, the present invention comprises a lighting device 40. More specifically, the light device 40 comprises a first light strip 41, a second light strip 42, and a light switch 43. The first light strip 41 is exteriorly positioned on the container 10. In the preferred embodiment of the present invention, the first light strip 41 is mounted on the front 11 or back 12, or both of the container 10. Further, the first light strip 41 is electrically connected to the battery 24 of the locking mechanism 20. The second light strip 42 is interiorly positioned in the first cavity 18 of the container 10 adjacent the first aperture 181. The first light strip 41 and the second light strip 42 can be in any length and shape, and can include, but are not limited to, LED (Light Emit Diode) lights. The light switch 43 is mounted to the top 13 of the container 10, preferably between the exterior and interior surfaces of the top 13. The light switch 43 is electrically connected to the second light strip 42 and the battery 24 of the locking mechanism 20. Additionally, the light switch 13 functions in a way including, but not limited to, switching on the second light strip 42 when the first aperture 181 is opened, and switching off the second light strip 42 when the first aperture 181 is closed.

Figure 15:
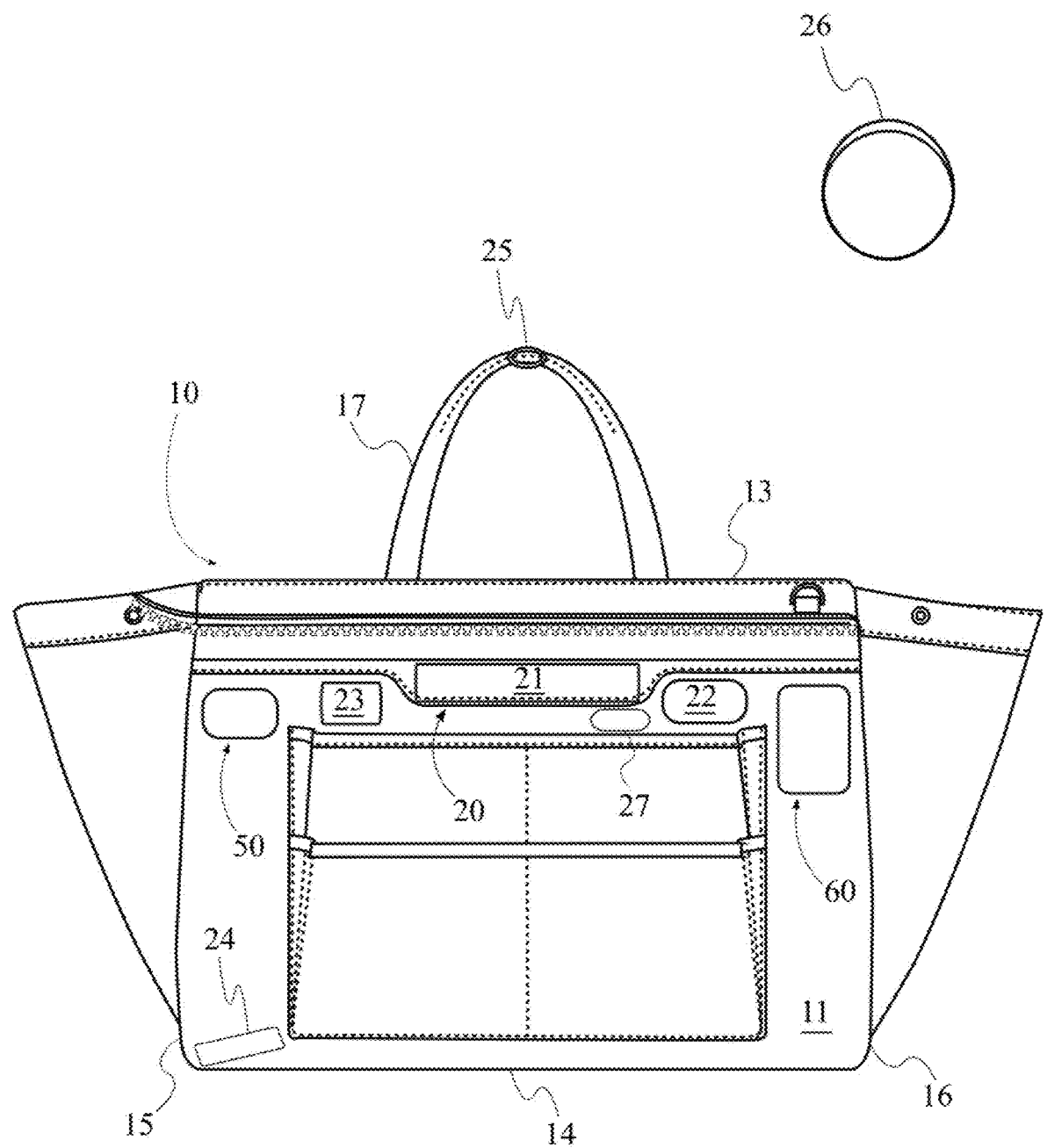
FIG. 15 is a front view of the apparatus of the present invention.

As can be seen in FIG. 15, FIG. 19, and FIG. 23, the locking mechanism 20 of the present invention comprises the fail-secure lock 21, a RFID reader 22, a sensor 23, the battery 24, a portable tag 26, and an alarm transmitter 27. More specifically, the fail-secure lock 21 is coupled with the PC device 90 and can communicate with the PC device 90 through a network including, but not limited to, Internet, wireless network, or any other suitable network. The sensor 23 is exteriorly mounted to the container adjacent fail-secure lock 21 and electrically connected to the battery 24. Additionally, the sensor 23 is coupled with the PC device 90 and can communicate with the PC device 90 in the same way as the fail-secure lock 21. Further the sensor 23 can be, but is not limited to a tamper-sensing device, a facial recognition device, a fingerprint recognition device, an eye/iris recognition device, a voice recognition device, a camera, a digital video recorder, a scanner, or any other suitable device for biometric recognition with or without artificial intelligence technology. In exemplary embodiments of the present invention, the sensor 23 can send a tampering signal to the PC device 90, which then send alarms and/or alarm messages to the security authorities with and/or without any salient video or sound files also taken by the sensor 23. The sensor 23 starts taking photos, video or sound files of the environment around the container 10 whenever the PC device 90 sends a command to the sensor 23, or the sensor 23 senses tampering, or the panic switch 25 is turn on. The RFID reader 22 is exteriorly mounted to the container 10 adjacent the top 13 and electrically connected to the battery 24 and the fail-secure lock 21, as seen in FIG. 23. Additionally, the RFID reader 22 is coupled with the portable tag 26 for unlocking the fail-secure lock 21. The portable tag 26 can be preprogrammed to activate and unlock the fail-secure lock 21 working with the RFID reader 22. More specifically, the RFID reader 22 can scan and forward the information of the portable tag 26 which is brought into proximity with the RFID reader 22. Upon the successful reading and scanning thereof, the fail-secure lock 21 engages and unlocks. The portable tag 26 may include, but is not limited to, an IC (Integrated Circuit) tag, an RFID tag, an electronic tag, an RF (Radio Frequency) tag, etc. Additionally, the portable tag 26 may be worn by the user or kept on their person to engage with the RFID reader 22 and gain access to the container 10. The portable tag 26 may be provided in any number of embodiments including, but not limited to, bracelets, cards, necklaces, pendants, and so on. Further, the portable tag 26 may be single in count or elsewise provided in a plurality of arbitrary count to provide multiple means of access to the system. Further, the alarm transmitter 27 is arbitrarily and exteriorly mounted to the container 10 adjacent the fail-secure lock 21. The alarm transmitter 27 is electrically connected to the battery 24 and coupled with both the sensor 23 and the PC device 90 as seen in FIG. 23, thus, capable of engaging operations therebetween. The alarm transmitter 27 may further be enhanced to output a signal or stream powerful enough to be relayed to authorities in the event of the emergency, and/or any tampering detected by the sensor 23, and relying upon the container rather than the PC device 90. The alarms and/or alarm messages to the security authorities by the alarm transmitter 27 may include any salient video or sound files also taken by the sensor 23. More specifically, the panic switch 25 is coupled with the sensor 23 and the PC device 90, wherein the sensor 23 can be, but is not limited to a camera, or any other suitable video and sound recording device. The panic switch 25 is configured to initiate recording and forward of recordings to security authorities.

As can be seen in FIG. 15 and FIG. 23, the container of the present invention comprises a tracking device 50 and an electronic device charger 60. The tracking device 50 is mounted on the container 10 and electrically connected to the battery 24 of the locking mechanism 20. Additionally, the tracking device 50 is coupled with the panic switch 25 to provide the location of the container 10 in an event of emergency and/or tampering of the container. The user can also benefit from the tracking device 50 by pressing the panic switch 25 in any emergency to inconspicuously send an alarm to the authorities with the location of the user and the container 10 of the present invention. Further the tracking device 50 may include, but is not limited to a GPS (Global Positioning System), which may be an element of both the PC device 90 and the fail-secure lock 21, though preferably the fail-secure lock 21 may possess the GPS element alongside the panic switch 25. The electronic device charger 60 is exteriorly mounted on the container 10 and electrically connected to the battery 24 of the locking mechanism 20. In the preferred embodiment of the present invention, the electronic device charger 60 is attached to the front 11 of the container 10 adjacent the top 13 and the second side 16, as seen in FIG. 1. The electronic device charger 60 is able to supply power to the PC device 90 or inversely accept charge therethrough to recharge the battery 24 of the locking mechanism 20. The electronic device charger 60 may further optionally be embodied as a wireless charging plate to the PC device 90 and/or any other devices the user desired to charge, or receiving wireless charge to resupply the battery 24 of the locking mechanism 20. In an alternative embodiment of the present invention, the electronic device charger 60 is positioned preferably along the bottom 14 of the container 10 to charge the battery 24 of the locking mechanism 20 and to optimize coupling with an extraneous charging bay, station, or similar.

As can be seen in FIG. 19, the container 10 of the present invention comprises a second cavity 19 and a second aperture 191. More specifically, the second cavity is interiorly mounted to the container 10 opposite the ballistic armor plate 102 across the first cavity 18. The second aperture 191 is terminally positioned on the second cavity adjacent the first aperture 181 of the container 10. Further, the locking mechanism 20 is exteriorly mounted to the second cavity 19 adjacent the second aperture 191. Thus, the second cavity 19 can be used to securely hold a firearm holster 80 as the user desires with efficient and effective access through the use of the fail-secure lock 21 of the locking mechanism 20. In an alternative embodiment of the present invention, the fail-secure lock 21 of the locking mechanism 20 can be manually unlocked using a preset pass code by the user.

Figure 22:
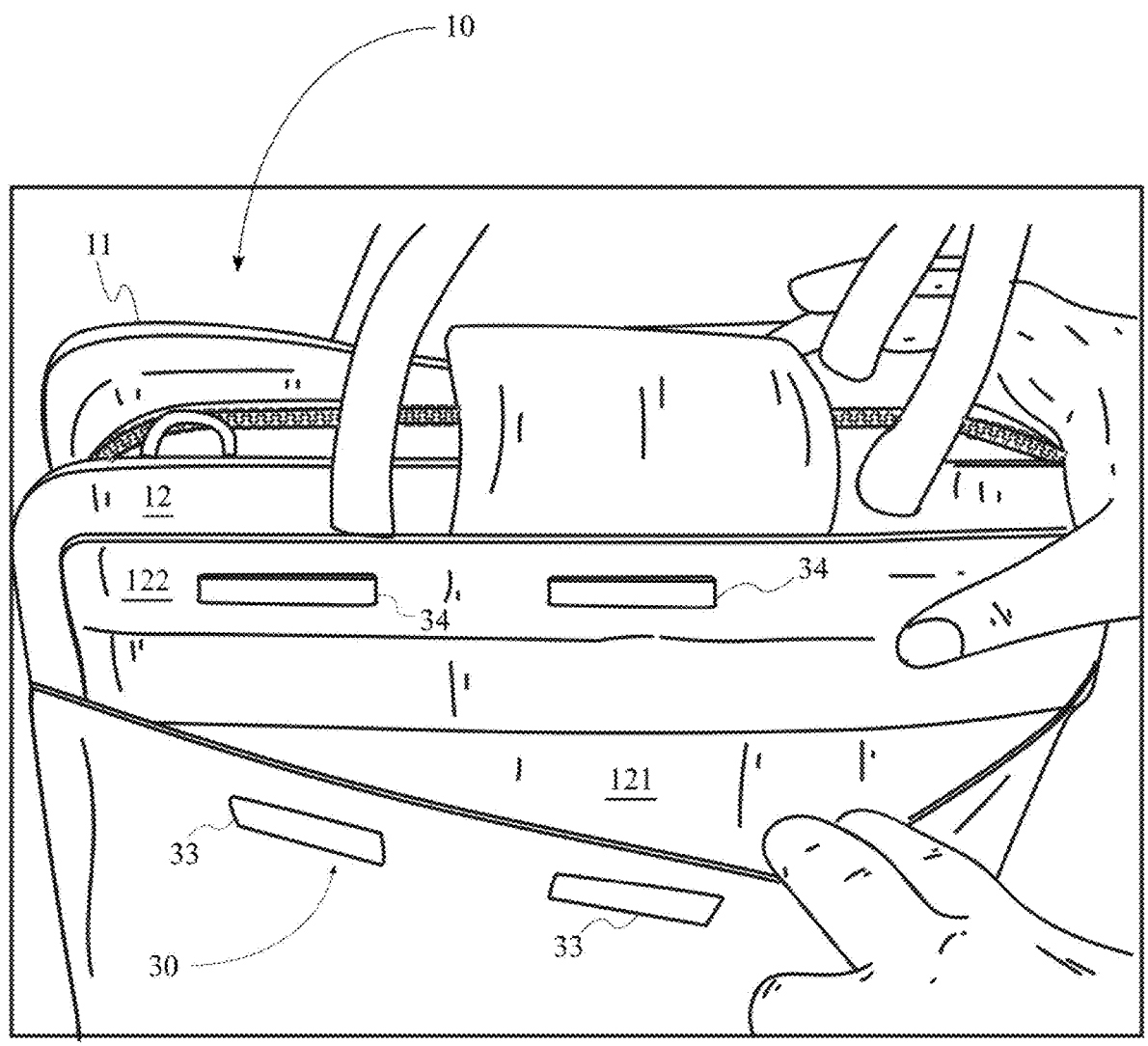
FIG. 22 is a back perspective view of the apparatus of the present invention illustrating an exterior pocket with a magnetic closure.

As can be seen in FIG. 22, the back 12 of the container 10 of the present invention comprises an exterior pocket 121, an exterior pocket aperture 122, and an exterior pocket cover 123. More specifically, the exterior pocket aperture 122 is terminally positioned on the exterior pocket 121 adjacent the top 13 of the container 10. The exterior pocket cover 123 is exteriorly and terminally attached to the exterior pocket aperture and the back 12 of the container 10. Further, the locking mechanism 20 is exteriorly mounted to the exterior pocket 121 adjacent the exterior pocket aperture 122. Thus, the firearm holster 80 can be securely stored in the exterior pocket 121 as the user desires with efficient and effective access through the use of the fail-secure lock 21 of the locking mechanism 20.

Figure 18:
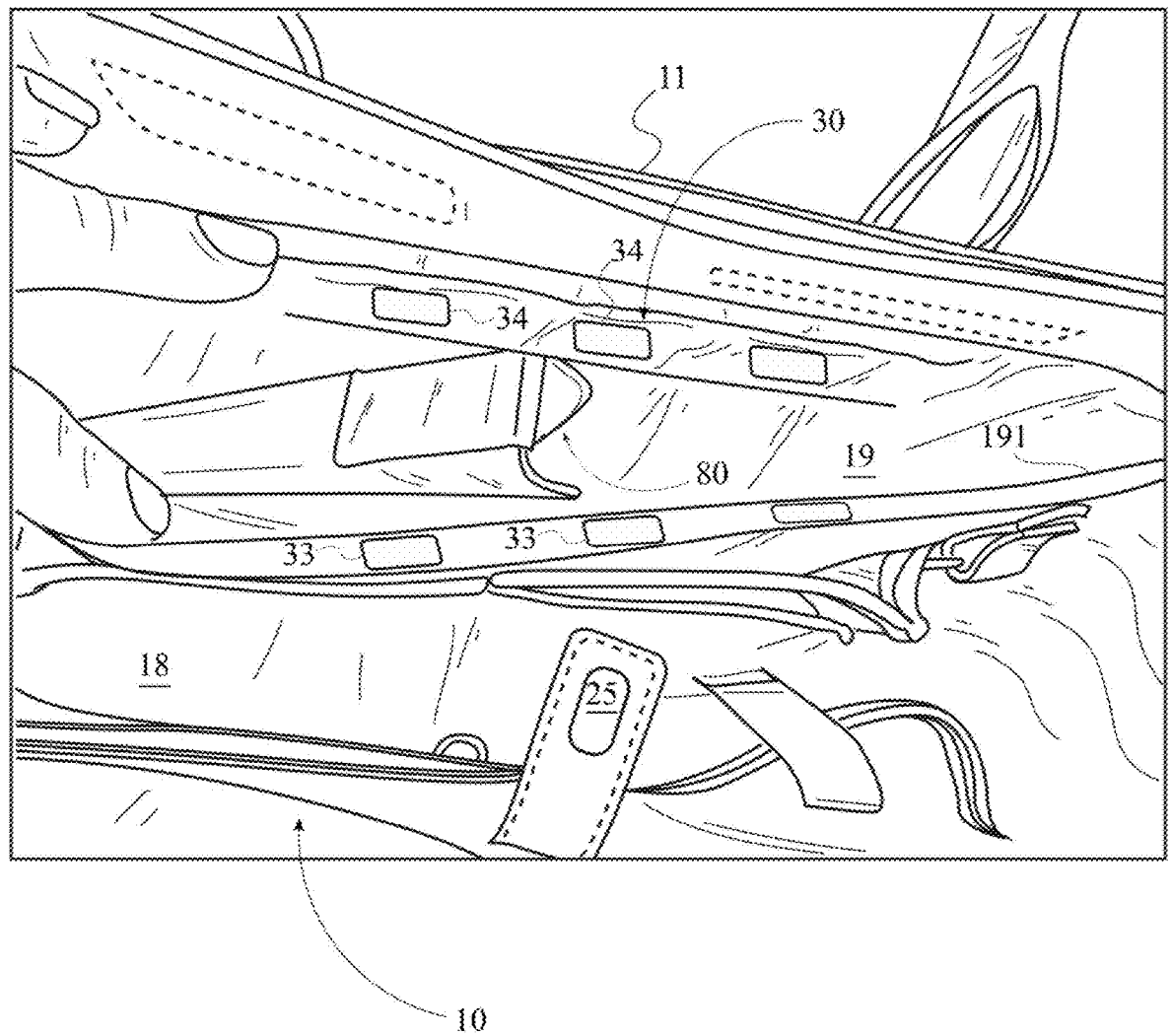
FIG. 18 is a top perspective view of the apparatus of the present invention illustrating a concealed carry weapon pocket and a magnetic closure.
Figure 20:
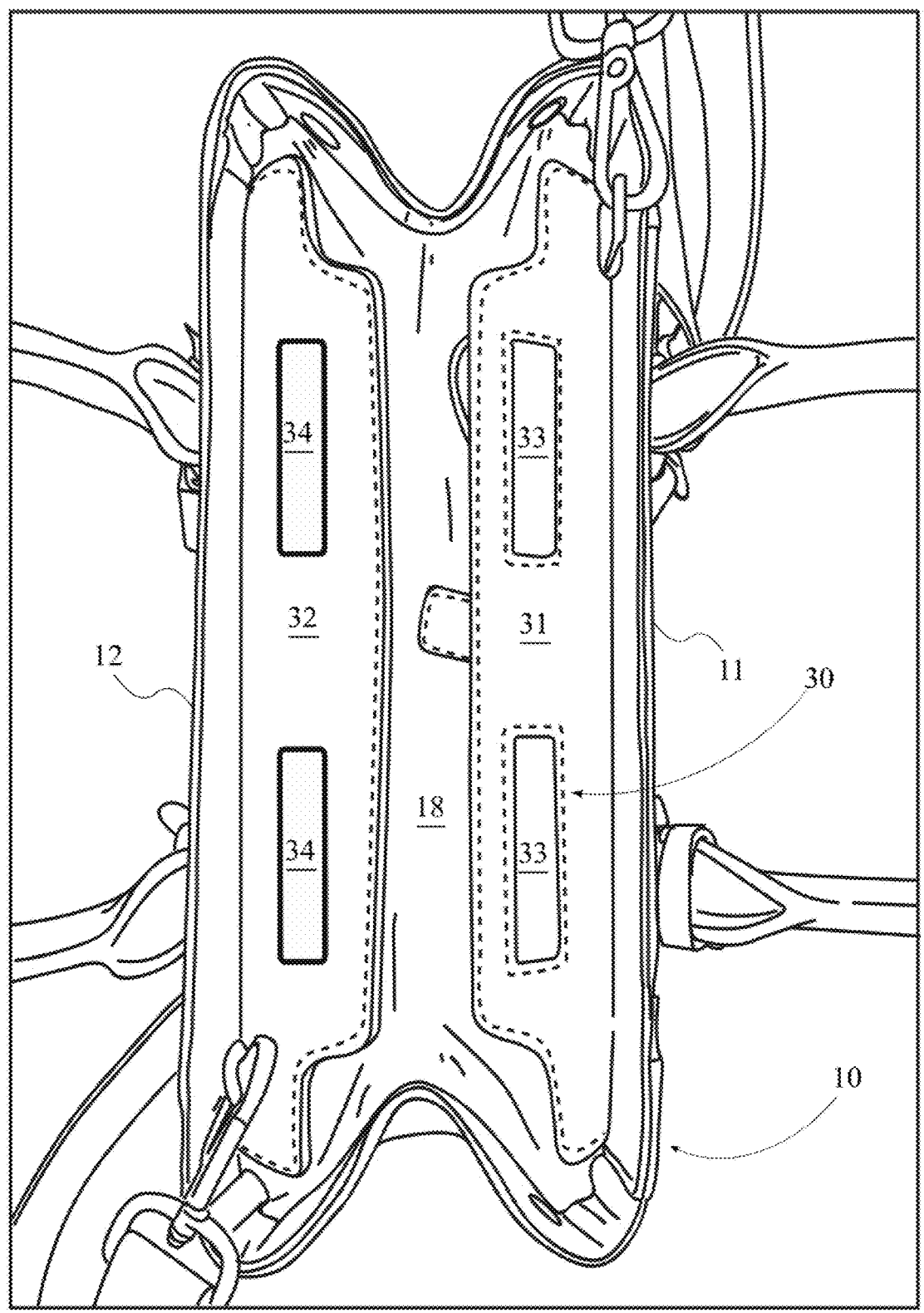
FIG. 20 is a top perspective view of the apparatus of the present invention illustrating a magnetic closure.

As can be seen in FIG. 17 to FIG. 18, and FIG. 20, in an alternative embodiment, the present invention comprises a magnetic closure 30. More specifically, the magnetic closure 30 comprises a first magnetic flap 31, a second magnetic flap 32, a plurality of first magnets 33, and a plurality of second magnets 34. The first magnetic flap 31 and the second magnetic flap 32 are exteriorly and terminally mounted to the top 13 of the container 10 adjacent the first aperture 181. The plurality of first magnets 33 is distributed across the first magnetic flap 31, and the plurality of second magnets 34 is distributed across the second magnetic flap 32 opposite the plurality of first magnets 33 across the first aperture 181 of the container 10 in order to access the CCW container 10 faster and/or get into the container generally faster. Thus, the magnetic closure 30 provides an alternative means to the user to efficiently and effectively open and close the first aperture 181 of the container 10. In another alternate embodiment, the container 10 with the magnetic closure 30 may also comprise the locking mechanism 30, which may not be positioned where the magnetic closure 30 is positioned on the container 10. As can be seen in FIG. 22, the magnetic closure 30 of the present invention may be mounted to the back 12 of the container 10. More specifically, in this alternative embodiment, the magnetic closure 30 is exteriorly mounted to the exterior pocket 121 adjacent the exterior pocket aperture 123. In another embodiment, the CCW container 10 with the magnetic closure 30 may also comprise all other components, and/or combination thereof for the CCW container 10 as described above.

Although the invention has been explained in relation to its preferred embodiment, it is to be understood that many other possible modifications and variations can be made without departing from the spirit and scope of the invention as hereinafter claimed.

What is claimed is:

1. A concealed carry weapon container comprising:
   a container;
   a locking mechanism;
   a panic switch;
   a ballistic armor plate;
   the ballistic armor plate being interstitially mounted between the interior and exterior surfaces of the container;
   the container comprising a top and a first cavity;
   the locking mechanism comprising a fail-secure lock and a battery;
   the battery being positioned inside the first cavity of the container;
   the fail-secure lock being exteriorly positioned on the container adjacent the top;
   the fail-secure lock being electrically connected to the battery;
   the panic switch being positioned on the exterior surface of the container; and
   the panic switch being electrically connected to the battery of the locking mechanism.

2. The concealed carry weapon container as claimed in claim 1 comprising:
   a lighting device;
   the lighting device comprising a first light strip;
   the first light strip being exteriorly positioned on the container;
   and the light strip being electrically connected to the battery of the locking mechanism.

3. The concealed carry weapon container as claimed in claim 1 comprising:
   a lighting device;
   the lighting device comprising a second light strip and a light switch;
   the second light strip being interiorly positioned in the first cavity of the container adjacent the first aperture;
   the light switch being mounted to the top of the container;
   and the light switch being electrically connected between the second light strip and the battery of the locking mechanism.

4. The concealed carry weapon container as claimed in claim 1 comprising:
   the container comprising a ballistic pocket;
   the ballistic pocket being interiorly mounted to the first cavity; and
   the ballistic armor plate being detachably and interiorly attached to the ballistic pocket.

5. The concealed carry weapon container as claimed in claim 1 comprising:
   the locking mechanism comprising a Radio Frequency Identification (RFID) reader and a portable tag;

the RFID reader being exteriorly mounted to the container adjacent the top;
the RFID reader being electrically connected to the battery and the fail-secure lock; and
the RFID reader being coupled with the portable tag for unlocking the fail-secure lock.

6. The concealed carry weapon container as claimed in claim 1 comprising:
a personal computing (PC) device;
the fail-secure lock being coupled with the PC device; and
the panic switch being coupled with the PC device.

7. The concealed carry weapon container as claimed in claim 6 comprising:
the locking mechanism comprising a sensor;
the sensor being exteriorly mounted to the container adjacent the fail-secure lock;
the sensor being electrically connected to the battery; and
the sensor being coupled with the PC device.

8. The concealed carry weapon container as claimed in claim 7, wherein the sensor is a biometric recognition device.

9. The concealed carry weapon container as claimed in claim 7 comprising:
the locking mechanism comprising an alarm transmitter;
the alarm transmitter being exteriorly mounted to the container adjacent the fail-secure lock;
the alarm transmitter being electrically connected to the battery;
the alarm transmitter being coupled with the sensor; and
the alarm transmitter being coupled with the PC device.

10. The concealed carry weapon container as claimed in claim 7 comprising:
the panic switch being coupled with the sensor;
the panic switch being coupled with the PC device;
the sensor being a camera; and
wherein the panic switch is configured to initiate recording and forward of recordings to security authorities.

11. The concealed carry weapon container as claimed in claim 1 comprising:
an electronic device charger;
the electronic device charger being exteriorly mounted on the container; and
the electronic device charger being electrically connected to the battery of the locking mechanism.

12. The concealed carry weapon container as claimed in claim 1 comprising:
a tracking device;
the tracking device being mounted on the container;
the tracking device being electrically connected to the battery of the locking mechanism; and
the tracking device being coupled with the panic switch.

13. The concealed carry weapon container as claimed in claim 1 comprising:
the container comprising a second cavity and a second aperture;
the second cavity being interiorly mounted to the container opposite the ballistic armor plate across the first cavity;
the second aperture being terminally positioned on the second cavity adjacent the first aperture of the container; and
the locking mechanism being exteriorly mounted to the second cavity adjacent the second aperture.

14. The concealed carry weapon container as claimed in claim 1 comprising:
the container comprising a back;
the back comprising an exterior pocket, an exterior pocket aperture, and an exterior pocket cover;
the exterior pocket aperture being terminally positioned on the exterior pocket adjacent the top of the container;
the exterior pocket cover being exteriorly and terminally attached to the exterior pocket aperture and the back of the container; and
the locking mechanism being exteriorly mounted to the exterior pocket adjacent the exterior pocket aperture.

15. A concealed carry weapon container comprising:
a container;
a magnetic closure;
a panic switch;
a ballistic armor plate;
the ballistic armor plate being interstitially mounted between the interior and exterior surfaces of the container;
the container comprising a top, a first cavity, and a first aperture;
the first aperture being positioned on the first cavity adjacent the top;
the magnetic closure comprising a first magnetic flap, a second magnetic flap, a plurality of first magnets, and a plurality of second magnets;
the first magnetic flap and the second magnetic flap being exteriorly and terminally mounted to the top of the container adjacent the first aperture;
the plurality of first magnets being distributed across the first magnetic flap; and
the plurality of second magnets being distributed across the second magnetic flap opposite the plurality of first magnets across the first aperture.

16. The concealed carry weapon container as claimed in claim 15 comprising:
the container comprising a ballistic pocket;
the ballistic pocket being interiorly mounted to the first cavity; and
the ballistic armor plate being detachably and interiorly attached to the ballistic pocket.

17. The concealed carry weapon container as claimed in claim 15 comprising:
a locking mechanism;
the locking mechanism comprising a fail-secure lock and a battery;
the battery being positioned inside the first cavity of the container;
the fail-secure lock being positioned on the container; and
the fail-secure lock being electrically connected to the battery.

18. The concealed carry weapon container as claimed in claim 17 comprising:
the container comprising a second cavity and a second aperture;
the second cavity being interiorly mounted to the container opposite the ballistic armor plate across the first cavity;
the second aperture being terminally positioned on the second cavity adjacent the first aperture of the container; and
the locking mechanism being exteriorly mounted to the second cavity adjacent the second aperture.

19. The concealed carry weapon container as claimed in claim 17 comprising:
the container comprising a back;
the back comprising an exterior pocket, an exterior pocket aperture, and an exterior pocket cover;

the exterior pocket aperture being terminally positioned on the exterior pocket adjacent the top of the container;

the exterior pocket cover being exteriorly and terminally attached to the exterior pocket aperture and the back of the container; and the locking mechanism being exteriorly mounted to the exterior pocket adjacent the aperture.

20. The concealed carry weapon container as claimed in claim 17 comprising:

the locking mechanism comprising a Radio Frequency Identification (RFID) reader and a portable tag;

the RFID reader being exteriorly mounted to the container adjacent the top;

the RFID reader being electrically connected to the battery and the fail-secure lock; and the RFID reader being coupled with the portable tag for locking and unlocking the fail-secure lock.

21. The concealed carry weapon container as claimed in claim 17 comprising:

a personal computing (PC) device;

the fail-secure lock being coupled with the PC device; and the panic switch being coupled with the PC device;

the locking mechanism comprising a sensor;

the sensor being a biometric recognition device;

the sensor being mounted to the container adjacent the fail-secure lock;

the sensor being electrically connected to the battery; and the sensor being coupled with the PC device.

22. The concealed carry weapon container as claimed in claim 15 comprising:

the container comprising a back;

the back comprising an exterior pocket, an exterior pocket aperture, and an exterior pocket cover;

the exterior pocket aperture being terminally positioned on the exterior pocket adjacent the top of the container;

the exterior pocket cover being exteriorly and terminally attached to the exterior pocket aperture and the back of the container; and the magnetic closure being exteriorly mounted to the exterior pocket adjacent the exterior pocket aperture.

* * * * *